United States Patent
Renfors et al.

(10) Patent No.: US 10,778,476 B2
(45) Date of Patent: Sep. 15, 2020

(54) DISCONTINUOUS FAST-CONVOLUTION BASED FILTER PROCESSING

(71) Applicant: Nokia Technologies Oy, Espoo (FI)

(72) Inventors: Markku Renfors, Tampere (FI); Kari Pekka Pajukoski, Oulu (FI); Toni Aleksi Levanen, Tampere (FI); Juha Yli-Kaakinen, Tampere (FI); Alaa Eddin Loulou, Tampere (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 16/439,054

(22) Filed: Jun. 12, 2019

(65) Prior Publication Data
US 2020/0007361 A1   Jan. 2, 2020

(30) Foreign Application Priority Data
Jun. 29, 2018   (FI) .................................... 20185602

(51) Int. Cl.
*H04L 27/26* (2006.01)
*H04L 25/03* (2006.01)
(Continued)

(52) U.S. Cl.
CPC ...... *H04L 25/03006* (2013.01); *H04L 1/0008* (2013.01); *H04L 5/0007* (2013.01);
(Continued)

(58) Field of Classification Search
CPC . H04L 27/2602; H04L 5/0023; H04L 5/0048; H04L 5/0044; H04L 27/2605; H04L 1/0057; H04L 27/2607
(Continued)

(56) References Cited

U.S. PATENT DOCUMENTS

| | | | |
|---|---|---|---|
| 2003/0002471 A1* | 1/2003 | Crawford | H04B 7/0811 370/343 |
| 2004/0024592 A1* | 2/2004 | Matsunuma | G10L 19/022 704/212 |

(Continued)

FOREIGN PATENT DOCUMENTS

WO   WO-2017/167386 A1   10/2017

OTHER PUBLICATIONS

Yli-Kaakinen, Juha, et al., "Optimized Fast Convolution Based Filtered-OFDM Processing for 5G", Laboratory of Electronics and Communications Engineering, Tampere University of Technology, Finland, Jun. 15, 2017, 21 pgs.

(Continued)

*Primary Examiner* — Emmanuel Bayard
(74) *Attorney, Agent, or Firm* — Harrington & Smith

(57) ABSTRACT

According to an aspect, there is provided a waveform processing device. The waveform processing device includes circuitry for receiving an input signal including one or more subsequent orthogonal frequency division multiplexing, OFDM, symbol blocks each of which includes a cyclic prefix and an OFDM data block and corresponds to one or more subbands. Further, the waveform processing device includes circuitry for segmenting each OFDM symbol block of the input signal into a set of a pre-defined number of partially overlapping signal blocks of equal length so that non-overlapping samples of the pre-defined number of partially overlapping signal blocks in each set include, in combination, an OFDM data block. Moreover, the waveform processing device includes circuitry for filtering each signal block in each set and for combining the filtered signal blocks in each set using overlap-and-save processing to produce one or more filtered OFDM data blocks for each subband.

26 Claims, 14 Drawing Sheets

(51) Int. Cl.
 H04L 5/00 (2006.01)
 H04L 1/00 (2006.01)
(52) U.S. Cl.
 CPC .......... *H04L 5/0094* (2013.01); *H04L 5/0098* (2013.01); *H04L 27/2602* (2013.01); *H04L 27/2628* (2013.01); *H04L 2025/03522* (2013.01); *H04L 2025/03528* (2013.01)
(58) Field of Classification Search
 USPC ........................................................ 375/260
 See application file for complete search history.

(56) References Cited

U.S. PATENT DOCUMENTS

| | | | | | |
|---|---|---|---|---|---|
| 2005/0270195 | A1* | 12/2005 | Kim | .................. | G10L 19/035 341/106 |
| 2007/0189404 | A1* | 8/2007 | Baum | ................ | H04L 25/0228 375/260 |
| 2008/0232504 | A1* | 9/2008 | Ma | .................. | H04L 27/2626 375/267 |
| 2009/0161749 | A1* | 6/2009 | Nangia | ................ | H04L 5/0007 375/233 |
| 2009/0220022 | A1* | 9/2009 | Eberlein | ............ | H04L 27/2633 375/267 |
| 2015/0304146 | A1* | 10/2015 | Yang | .................. | H04L 5/0066 370/329 |
| 2015/0365263 | A1* | 12/2015 | Zhang | ................ | H04L 1/0009 375/295 |
| 2016/0338081 | A1* | 11/2016 | Jiang | ................ | H04W 72/1205 |
| 2017/0237596 | A1 | 8/2017 | Wild et al. | | |
| 2017/0331647 | A1* | 11/2017 | Abdelghaffar | ...... | H04L 27/2634 |

OTHER PUBLICATIONS

Yli-Kaakinen, Juha, et al., "Optimized Fast Convolution Based Filtered-OFDM Processing for 5G", © 2017 IEEE, 6 pgs.
"Overlap-save method", Wikipedia, May 1, 2018, 2 pgs.
"Overlap-add method", Wikipedia, Mar. 13, 2017, 3 pgs.
M. Renfors et al.; "Efficient Fast-Convolution Implementation of Filtered CP-OFDM Waveform Processing for 5G"; IEEE Globecom Workshops; Dec. 2015; pp. 1-7.
J. Yli-Kaakinen et al.; "Efficient Fast-Convolution-Based Waveform Processing for 5G Physical Layer"; IEEE Journal on Selected Areas in Communications, vol. 35, No. 6; Jun. 6, 2017; pp. 1309-1326.
J. Yli-Kaakinen et al.; "Optimized Reconfigurable Fast Convolution-Based Transmultiplexers for Flexible Radio Access"; IEEE Transactions on Circuits and Systems—II: Express Briefs, vol. 65, No. 1; Jan. 2018; pp. 130-134.

* cited by examiner

DISCONTINUOUS FAST-CONVOLUTION BASED FILTER PROCESSING

FIELD OF THE INVENTION

Various example embodiments relate generally to wireless communications, and more particularly to waveform processing in a communications system.

BACKGROUND ART

The following description of background art may include insights, discoveries, understandings or disclosures, or associations together with dis-closures not known to the relevant art prior to the present invention but provided by the invention. Some such contributions of the invention may be specifically pointed out below, whereas other such contributions of the invention will be apparent from their context.

The fifth generation (5G) cellular systems aim to improve the throughput by a huge factor (even up to 1000 or more), which presents a multitude of challenges, especially considering the scarcity of spectrum at low frequency bands and the need for supporting a very diverse set of use cases. In order to reach this goal, it is important to exploit the higher frequencies such as millimeter wave frequencies in addition to the more conventional lower frequencies. To meet the demands of 5G systems, a new, globally standardized radio access technology known as New Radio (NR) has been proposed. Due to diverse service requirements imposed by NR, a high level spectral containment in the transmitter is required to isolate transmissions with different numerology (so called mixed numerology scenarios) or asynchronous traffic. This, in turn, necessitates new types of waveform processing solutions for achieving sufficiently high performance without sacrificing computational efficiency or flexibility.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise methods, apparatuses, and computer programs as defined in the independent claims. Further embodiments of the invention are disclosed in the dependent claims.

BRIEF DESCRIPTION OF THE DRAWINGS

In the following, some example embodiments will be described with reference to the accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
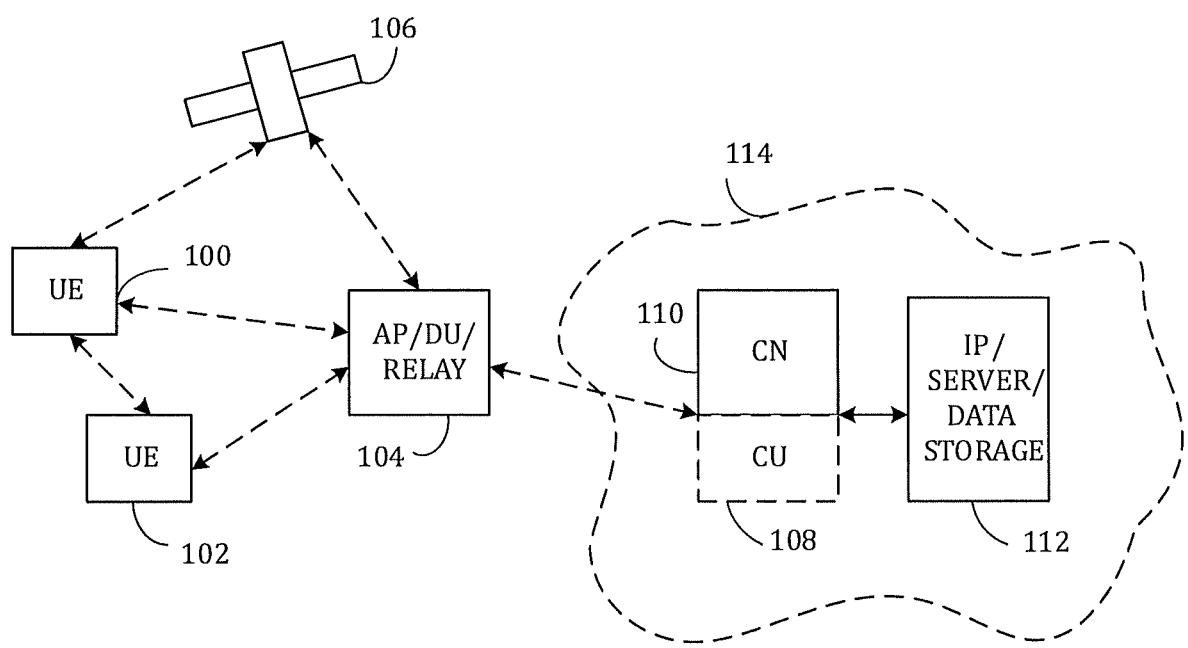
FIG. 1 illustrates an example of a communications system to which embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point, an access node or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT (information and communications technology) devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablet computers and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication system may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

One key element necessary for achieving high throughput broadband communications envisioned for 5G communication systems like the one shown in FIG. 1 is orthogonal frequency-division multiplexing (OFDM). According to a broad definition, OFDM is a method of encoding digital data on multiple carrier (or subcarrier) frequencies. More specifically, multiple closely spaced orthogonal subcarrier signals with overlapping spectra are used for carrying data. While OFDM is already used in 4G communications systems, the more stringent requirements for the 5G communications systems necessitate improvements to the established methods.

Figure 2:
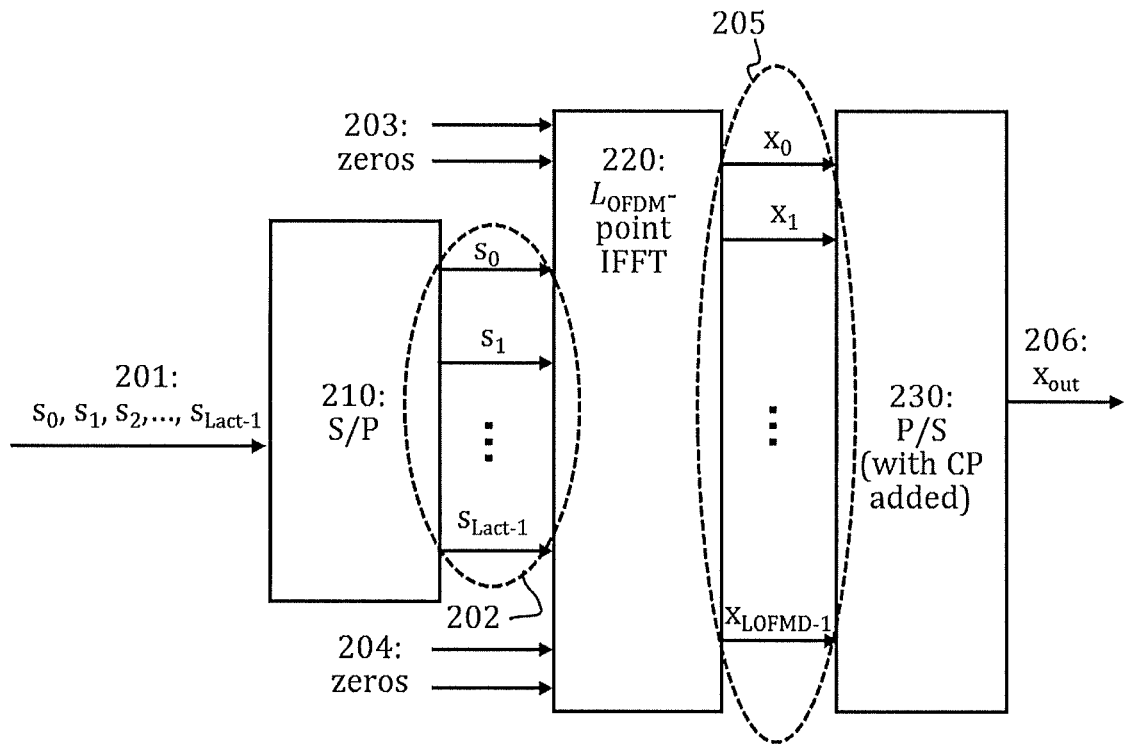
FIG. 2 illustrates fast Fourier transform based orthogonal frequency division multiplexing signal generation according to prior art.

To provide background for the embodiments to be discussed later, a conventional OFDM scheme is briefly discussed in relation to FIG. 2. FIG. 2 illustrates a generic system for generating an OFDM signal in a transmitter using inverse fast Fourier transform (IFFT).

Referring to FIG. 2, $L_{act}$ data symbols $s_0, s_1, s_2, \ldots, s_{L_{act}-1}$ 201 in series format are provided for transmission by a radio transmitter. Each data symbol 201 corresponds to a complex number according to a modulation scheme, e.g., QPSK (quadrature phase shift keying) or 16-QAM (16 quadrature amplitude modulation). From the point of view of the IFFT processing, each data symbol 201 in the series corresponds to a certain carrier frequency. Said data symbols 201 in series are provided as an input for a serial to parallel converter 210. The serial to parallel converter separates the data symbols 201 to $L_{act}$ parallel data streams 202. In the example of FIG. 2, the number of data symbols $L_{act}$ is not equal to the number of inputs $L_{OFDM}$ of the IFFT processing block 220 (i.e., the length of the IFFT). Thus, the input of the IFFT processing block 220 is padded with zeros 203, 204. The IFFT processing block 220 modulates the input data symbols 202, 203, 204 (corresponding to values assigned to frequency bins) and provides $L_{OFDM}$ parallel output signals $x_0, x_1, x_2, \ldots, x_{L_{OFDM}-1}$ 205 (time-domain signals). Due to the intrinsic properties of the IFFT (or Fourier transform in general), the generated carrier signals are always orthogonal. The parallel output signals 205 are provided as an input to a parallel to serial converter 230 which forms an output signal $x_{out}$ comprising one OFDM symbol (or equally OFDM symbol block) of $L_{OFDM}$ samples. The output signal may be further fed to a digital-to-analog converter and subsequently to an antenna of the corresponding radio transmitter. The main benefits of the OFDM are the high flexibility and efficiency in allocating the spectral resources to different users, simple and robust way of channel equalization as well as simplicity of combining the multiantenna schemes with core physical layer processing. OFDM or specifically FFT-based OFDM further enables to defining the signal in the frequency domain (in software) and to generate the signal using the computationally efficient, low complexity IFFT. A reverse process to the one illustrated in FIG. 2 needs to be carried out in the receiver receiving the OFDM signal.

In order to prevent the deterioration of the performance of the radio link due to multipath delay spread (that is, due to different multipath components of the transmitted signal arriving at the receiver at different times), a so-called cyclic prefix (CP) may be introduced to each OFDM symbol. This functionality may be performed by element 230. The cyclic prefix refers to an extension of a symbol by inserting a copy of $L_{CP}$ last samples of a symbol to the beginning of said symbol. Said process leads to an extended, but still continuous OFDM symbol (or a CP-OFDM symbol). The signal generated by said process is called a CP-OFDM signal. By choosing the cyclic prefix to be longer than the delay spread, the adverse effects of the delay spread (e.g., loss of orthogonality leading to intersymbol interference, ISI) may be avoided. Obviously, since symbol time is increased, the maximum achievable bit rate of transmission is reduced. In the receiver, an inverse process needs to be performed in order to remove the cyclic prefix.

While the CP-OFDM signal provides a sufficiently efficient solution for the needs of many current generation systems, it has several disadvantages which need to be overcome in order to meet the higher demands of the proposed future communications system. The CP-OFDM signal has relatively high side lobes in spectrum, which causes power leakage to adjacent channels and necessitates the use of larger guard bands which, in turn, degrades the spectral efficiency. Moreover, use of a power amplifier (PA) may further increase said power leakage.

It should be appreciated that the block diagram shown in FIG. 2 is a simplified presentation of the CP-OFDM scheme. The CP-OFDM scheme may further comprise performing, for example, mapping of the signal bits to complex numbers and/or insertion of pilot sequences (unmodulated data used for synchronization and channel estimation).

Figure 3A:
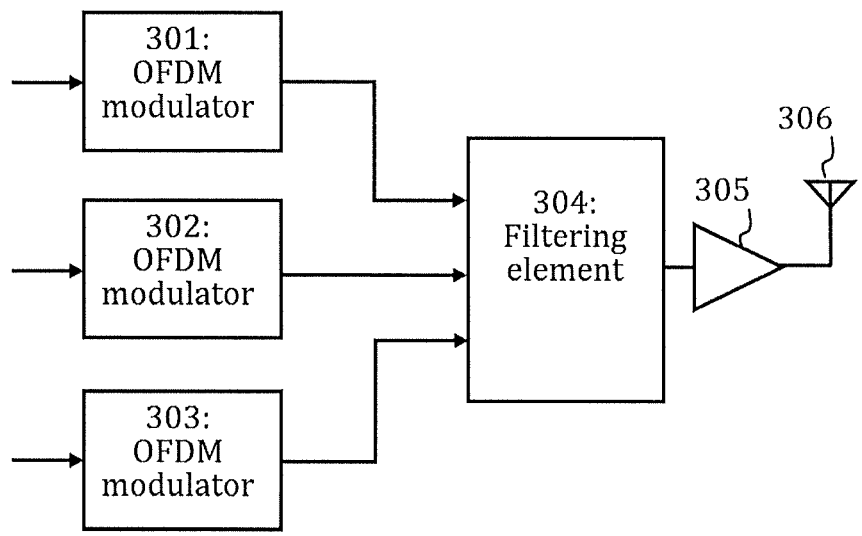
FIGS. 3A and 3B illustrate, respectively, simplified fast Fourier transform based orthogonal frequency division multiplexing transmitter and receiver architectures.
Figure 3B:
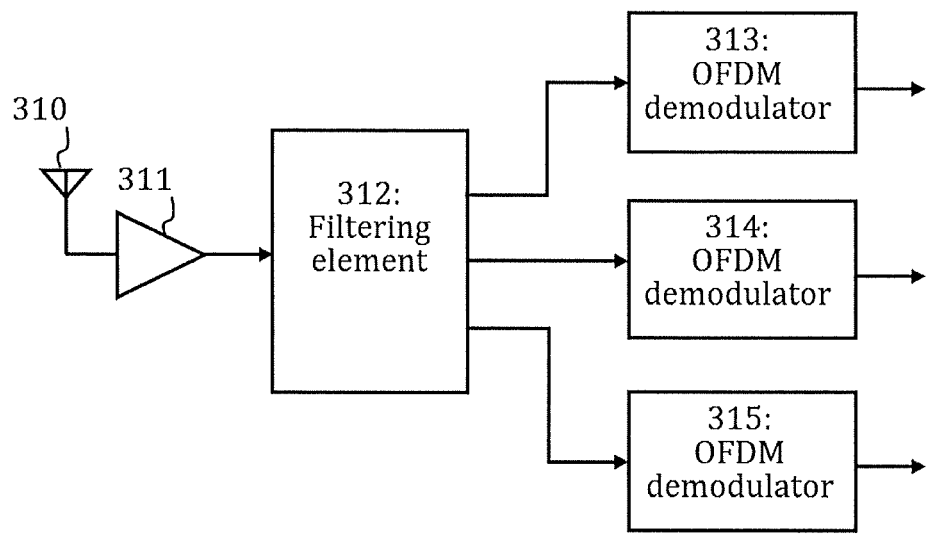

FIGS. 3A and 3B illustrate two solutions for overcoming the aforementioned problems with the CP-OFDM scheme, namely one solution implemented in the transmitter and one solution implemented in the receiver. In FIG. 3A, each of the OFDM modulators 301, 302, 303 may comprise at least some of the elements depicted in FIG. 2. Each OFDM modulator 301, 302, 303 may be configured to provide OFDM modulation for a particular subband of the frequency band of interest. In the scheme illustrated in FIG. 3A, the CP-OFDM signals produced by the OFDM modulators 301 to 303 are further filtered using a filtering element 304 to improve spectral containment. In other words, channel filtering is applied on top of the CP-OFDM technique. Specifically, the filtering element 304 may perform subband-wise filtering of the CP-OFDM signals of the radio channel, that is, first perform the filtering separately for one or more OFDM input signals consisting of one or more subbands to eliminate (or at least mitigate) any unwanted sidelobes, then modulate the filtered subbands to their desired locations, and finally combine the filtered and modulated signals to form a high-rate output signal. After the filtering stage 304, the resulting signal may be coupled via a digital-to-analog converter (not shown in FIG. 3A) and an amplifier 305 to an antenna 306 of the transmitter for transmission.

A receiver illustrated in FIG. 3B is configured to perform a reverse process compared to the transmitter of FIG. 3A. Namely, a received signal is first amplified by an amplifier 311 and thereafter fed via an analog-to-digital converter (not shown in FIG. 3B) to a filtering element 312 which is configured to filter said received amplifier signal as well as divide it into subband signals. The subband signals are subsequently fed to OFDM demodulators 313, 314, 315 which demodulate the provided OFDM signals, that is, extract the transmitted data symbols from them. While three OFDM demodulators 313, 314, 315 are depicted in FIG. 3B, some receivers may have comprise only one OFDM demodulator (e.g., UE device) and thus be configured to detect only one subband.

Conventionally, the spectral containment of an OFDM signal is improved using time-domain windowing in filtering element 304. Alternatively, the filtering element 304 may be configured to use a fast-convolution (FC) based approach, i.e., FC processing. In this approach when used at the transmitter side, the filtering is performed by converting each CP-OFDM signal corresponding to a subband to frequency domain using fast Fourier transform (FFT), applying a frequency-domain window to each subband-specific frequency-domain signal (i.e., multiplying each signal point-wise with the frequency-domain window) and converting said signals back to time-domain using IFFT. The resulting signals corresponding to different subbands are combined into a single signal before transmission. Similarly, the filtering at the receiver side is performed by converting received signal to frequency domain using FFT, applying a frequency-domain window separately to each subband of the received frequency-domain signal and converting resulting signals back to time-domain using IFFT. The frequency-domain window may consist of zeros in the stop band, ones in the passband, and separately optimized, non-trivial transition band weights, thus having an inbuilt simplicity for minimized storage requirements. FC-based approach effectively implements a time-domain convolution between the input signal and the frequency-domain window converted to time domain based on convolution theorem.

The performance of the filtered CP-OFDM scheme may be further improved by dividing the input signal into signal blocks or segments (i.e., FC processing blocks), processing said signal blocks separately and piecing the processed signal blocks back together. The exact number of FC processing blocks depends at least on the input sequence length, overlap factor (i.e., the ratio of the length of the overlapping part of a FC processing block to the total length of the FC processing block) and FFT size. In order to avoid detrimental edge effects arising from the segmentation, adjacent signal blocks may be overlapped in the segmenting using either overlap-and-save (OLS) processing or overlap-and-add (OLA) processing. While multiplication in frequency domain as implemented by the frequency-domain window in the aforementioned FC-based approach evaluates cyclic (or circular or periodic) convolution, the OLS and OLA methods may be used to approximate linear convolution using circular convolution by dividing the input signal into segments and employing piece-wise processing to the segmented input signal.

It should be noted that also the time-domain windowing may be carried out using a so-called windowed overlap-and-add (WOLA) technique where the time-domain signal is divided into overlapping blocks, each block is multiplied element-wise by time-domain window, and, finally, overlapped parts are added to form an output signal.

The filtered CP-OFDM (and especially FC-F-OFDM) as described in the previous paragraph may provide significant improvements in terms of out-of-band emissions compared to conventional CP-OFDM, especially when OLS or OLA scheme is used. Thus, CP-OFDM is conventionally used, e.g., in LTE systems. However, the 5G NR is required to support higher bandwidth utilization efficiency than LTE, where typically only 90% of the channel bandwidth is utilized. For 5G NR, 96% can be considered as a lower limit for bandwidth utilization efficiency and in most cases systems should support up to 99% bandwidth utilization efficiency, at least with some subcarrier spacings (SCSs). These higher requirements are demanding to satisfy with conventional time-domain filtering solutions.

Multiple problems or bottlenecks in the filtering limiting performance of the conventional filtered OFDM solutions (i.e., time-domain filtering-based OFDM) may be identified. For example, the time-domain filtering often has high complexity leading to a computationally demanding implementations while OFDM solutions based on classical (e.g., polyphase) filter bank models are often inflexible. Due to the FC-F-OFDM being a block-wise, continuous processing scheme with fixed block length, the position of the useful parts of the OFDM symbols vary within the frame of transmitted OFDM symbols. In existing FC-F-OFDM-based receivers, the filtering is carried out not only for said useful parts but also for the cyclic prefixes. Depending on the overlap factor used in FC-processing, this inclusion of the cyclic prefixes in the processing may lead to a larger number of FC processing blocks being used in the FC processing than what would be necessary based on the overall length of the useful parts. Therefore, a scheme which only processes the useful parts of each OFDM symbol would reduce the computational complexity significantly, especially in mini-slot transmission.

At both transmitter and receiver sides, it is necessary, if conventional continuous FC processing is used, that the lengths of the cyclic prefix and useful symbol durations correspond to an integer number of samples at the lower sampling rate used for receiver OFDM processing for each subband. In the case of narrowband allocations, this restriction limits the choice of the short IFFT length in the FC processing and the FFT length in the subsequent receiver OFDM processing (e.g., elements 313, 314, 315 of FIG. 3B) and may thus lead to an implementation with an unnecessarily high computational complexity. With the LTE/5G NR numerology, the shortest possible transform length is 128, while length-16 transform would be sufficient when a subband contains one physical-layer resource block (PRB) only. This restriction applies to both time-domain filtering and FC-based solutions with continuous processing model.

Figure 4:
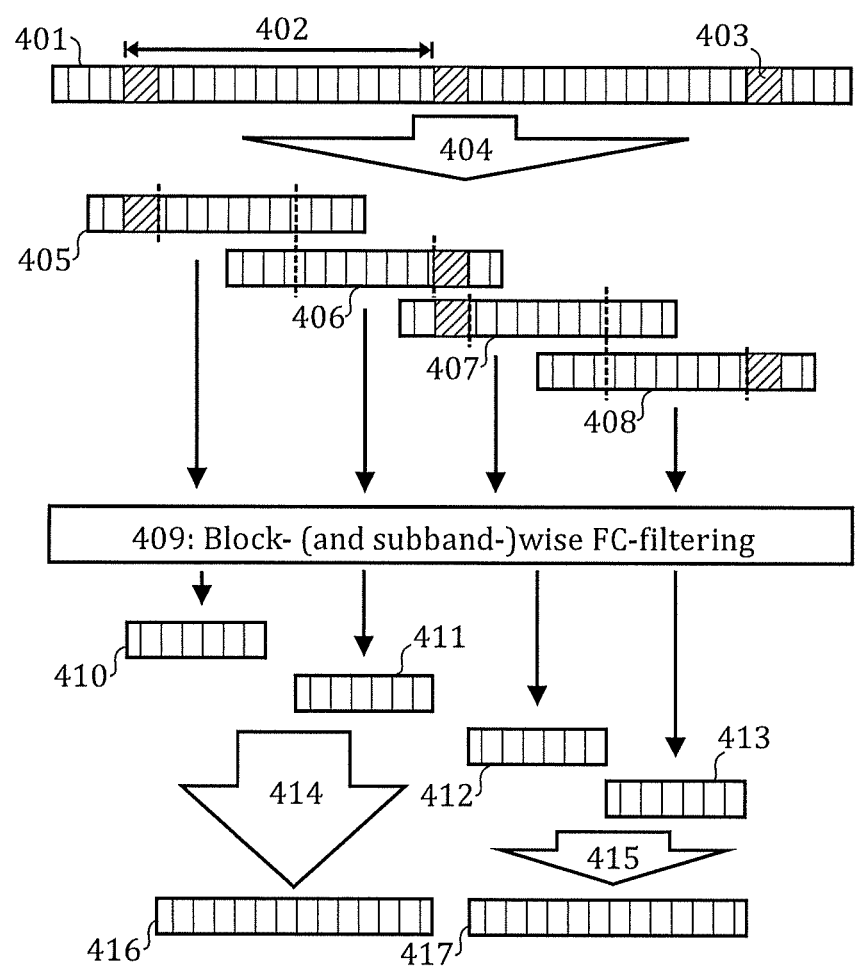
FIGS. 4 and 5 illustrate exemplary processes according to embodiments.

FIG. 4 illustrates a waveform processing scheme (or specifically FC processing scheme) carried out by a waveform processing device (e.g., a filter, a filter bank or a filtering engine) in a radio receiver configured to perform OFDM or CP-OFDM according to an embodiment for overcoming at least some of the problems relating to conventional filter processing schemes outlined above. As opposed to the aforementioned OFDM schemes as well as other conventional OFDM schemes (e.g., so-called block-filtered OFDM scheme) which typically apply filtering in a continuous manner over a frame of CP-OFDM (or zero-prefix-OFDM) symbols, the illustrated waveform processing scheme applies filtering in a discontinuous manner. The waveform processing scheme may correspond to steps carried out by the filtering element 312 of FIG. 3B. In FIG. 4, the FC processing scheme according to the embodiment is demonstrated for a mini-slot of two (CP-)OFDM symbols. In other embodiments, a (mini-)slot of one or more OFDM symbols may be processed.

Referring to FIG. 4, the element 401 corresponds to a received input signal comprising two subsequent OFDM symbol blocks 402 before filtering. In the general case according to embodiments, a received input signal may comprise one or more subsequent OFDM symbol blocks. Each OFDM symbol block (or simply OFDM symbol) comprises a cyclic prefix 403 (denoted by an angled line pattern) and may correspond to one or more subbands. After the OFDM signal is received, the waveform processing device segments, in element 404, each OFDM symbol block of the input signal into a pair of two partially overlapping signal blocks 405, 406, 407, 408 (so-called FC processing blocks) having equal length so that non-overlapping samples of a first signal block 405, 407 in each pair correspond to a first half of an OFDM data block and non-overlapping samples of a second signal block 406, 408 in each pair correspond to a second half of the same OFDM symbol block. Thus, the resulting parallel signal blocks 405, 406, 407, 408 are synchronized with the OFDM symbol blocks. Non-overlapping samples are defined here and in the following as samples of a partially overlapping signal blocks corresponding to samples of the same signal block without any overlapping. The bounds of non-overlapping samples in each signal block 405, 406, 407, 408 are denoted in FIG. 4 by two dashed lines. The overlapping sections may be defined using an overlapping factor. The overlapping factor may be, for example, 0.5 (as is illustrated in FIG. 4) or 0.25. The cyclic prefix may be included in the leading overlapping section of the first signal block of each OFDM symbol block. A certain number of samples of each first signal block 405, 407 need to be taken from the preceding OFDM symbol. Similarly, a certain number of samples of each second signal block 406, 408 need to be taken from the following OFDM symbol.

The waveform processing device filters, in block 409, each signal block in each pair. For example, the waveform processing device may apply at least a first transform-domain window function, where the first transform-domain window function may be defined and applied subband-specifically. In other words, FC processing may be employed for filtering each signal block in each subband. After the actual filtering, the waveform processing device may discard, in block 409, any overlapping sections of subsequent filtered signal blocks according to overlap-and-save processing. A more detailed description of this implementation of block 409 is discussed in relation to FIG. 5. In other embodiments, other filtering techniques (e.g., WOLA) may be employed.

The filtering in block 409 results in one or more subband-specific sets of pairs of filtered signal blocks, where each pair corresponds to an OFDM symbol block at a certain subband. FIG. 4 illustrates the resulting filtered signal blocks 410, 411, 412, 413 only for a single subband for clarity. Each filtered signal block 410, 411, 412, 413 contains only samples corresponding to non-overlapping samples of the corresponding first/second signal block 405, 406, 407, 408. The waveform processing device combines, in elements 414, 415, filtered signal blocks 410, 411, 412, 413 pair-wise (e.g., concatenating filtered signal blocks 410, 411) to produce two or more filtered OFDM data blocks 416, 417 (i.e., filtered OFDM symbol blocks without a cyclic prefix) for each subband. The discarding according to overlap-and-save processing may be equally performed, instead of in conjunction with the filtering in block 409, as a part of the combining steps implemented in elements 414, 415. In some embodiments, the overlap-and-save processing may be omitted altogether and other type of processing, instead of the overlap-and-save processing, may be employed in elements 414, 415 for combining the overlapping filtered signal blocks.

While FIG. 4 illustrates an exemplary process where each OFDM symbol block 402 is segmented into two partially overlapping signal blocks (or FC processing blocks), in other embodiments each OFDM symbol block of the input signal may be segmented into a set of a pre-defined number of partially overlapping signal blocks of equal length. Non-overlapping samples of partially overlapping signal blocks in each set may comprise, in combination, an OFDM data block. Each signal block may comprise the same amount of OFDM data block samples. In other words, in the general case (including also the embodiment of FIG. 4), each OFDM symbol block is divided into N signal blocks so that overlapping samples of the kth signal block comprises samples of the OFDM symbol block with sample indices $k(L_{OFDM}/N)+r$, where $k=0, 1, \ldots, N-1$ and $r=0, 1, \ldots, (L_{OFDM}/N)-1$ and $L_{OFDM}$ is the transform size used to build the OFDM symbol (i.e., a length of the OFDM symbol block). For example, if N is equal to 2 (as in FIG. 4), the first signal block comprises samples of the OFDM symbol block with sample indices $r=0, 1, \ldots, (L_{OFDM}/2)-1$ and the second signal block comprises samples of the OFDM symbol block with sample indices $r=L_{OFDM}/2+0, L_{OFDM}/2+1, \ldots, L_{OFDM}-1$.

Figure 5:
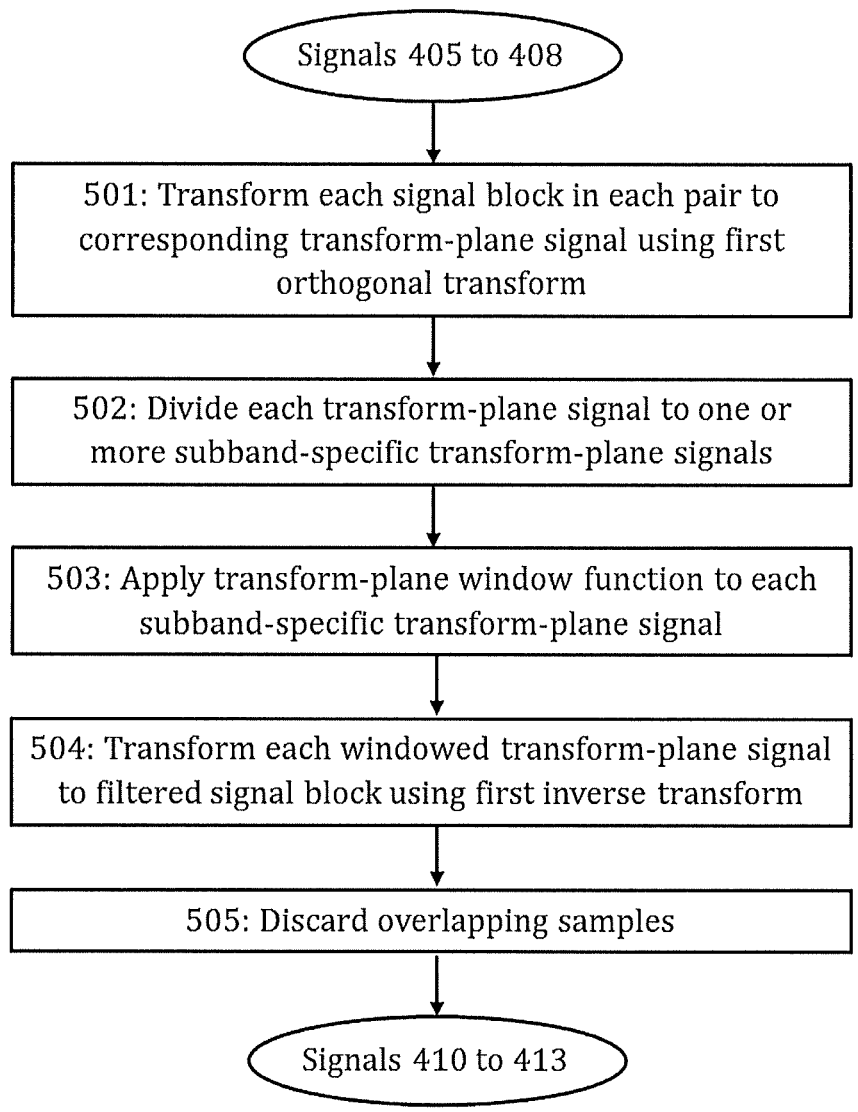

FIG. 5 illustrates a process for performing the filtering in block 409 according to an exemplary embodiment. The illustrated process corresponds to fast convolution processing with a single transform-domain window and to the case where each OFDM symbol block is divided into two signal blocks. Obviously, said process may be equally applied for any signal block segmented from an OFDM symbol block according to any segmentation as described in the previous paragraph. In other embodiments, one or more additional transform-domain and/or time-domain windows may be applied.

Referring to FIG. 5, the waveform processing device transforms, in block 501, each signal block 405, 406, 407, 408 in each pair (corresponding to first and second halves of an OFDM symbol) to a corresponding transform-domain signal using a first orthogonal transform. The first orthogonal transform may be one of a discrete Fourier transform, a fast Fourier transform, a Hartley transform and a number theoretic transform. Then, the waveform processing device divides, in block 502, each transform-domain signal to one or more subband-specific transform-domain signals to produce one or more subband-specific sets of transform-domain signals. Obviously, if only one subband is defined, the dividing in block 502 may be omitted. Further, in some embodiments, the division into subband-specific signals may be carried out already before the first orthogonal transform or at a later stage if subband-specific transform-domain windowing is not required. The waveform processing device applies, in block 503, the transform-domain window function to each transform-domain signal in each subband-specific set. The transform-domain window function may be defined independently for each subband-specific set (i.e., for each subband). The waveform processing device transforms, in block 504, each windowed transform-domain signal to a filtered signal block using a first inverse transform which is an inverse transform of the first orthogonal transform. The length of the first inverse transform may be much smaller than the length of the first orthogonal transform to reduce the computational load. Finally, the waveform processing device discards, in block 505, any overlapping samples of filtered signal blocks according to overlap-and-save processing so that only the useful parts (i.e., OFDM data blocks) of the received OFDM signal remain in a filtered form. In some embodiments, the overlapping samples to be discarded may be stored to a memory before the discarding so that they may be used later, e.g., for timing adjustment. Alternatively, block 505 (i.e., step of discarding of the overlapping samples) may be omitted, in some embodiments, to enable taking advantage of the overlapping samples. The process of FIG. 5 results in signal blocks defined for each subband corresponding to the filtered signal blocks 410, 411, 412, 413 of FIG. 4.

As an example of the benefit of the discontinuous FC processing, in the 10 MHz 5G NR case with 15 kHz subcarrier spacing (SCS) and normal CP length, the received signal 401 of FIG. 4 has the following properties: high sampling rate is 15.36 MHz, the useful OFDM symbol duration is 1024 high-rate samples and the CP length is 80 high-rate samples for the first symbol of each slot of 7 symbols and 72 samples for the others. Using conventional continuous FC processing, the smallest possible low sampling rate (corresponding to filtered signals 416, 417) is 1.92 MHz and the CP length is 10 or 9 samples at low rate. However, with narrow subband allocations, like 12, 24 or 48 subcarriers, the short transform length may be reduced to 16, 32 and 64, respectively, using the discontinuous FC processing (with N=2) as illustrated in FIG. 4. Furthermore, the same reduction of the FFT length takes place in the OFDM receiver subband processing (e.g., elements 313, 314, 315 of FIG. 3B).

The discontinuous FC processing provides many benefits compared to the conventional continuous FC processing and/or time-domain processing. With continuous processing, the FC processing chain needs to wait for varying number of samples belonging to the second OFDM symbol block before it can start processing the first FC processing block of the second OFDM symbol block in order to obtain final samples in the output for the first OFDM symbol block. In the discontinuous FC processing, as discussed in relation to FIGS. 4 and 5, the receiver waits only for the samples belonging to the first OFDM symbol block and desired amount of overlapping samples from the beginning of the second OFDM symbol block, after which it can start processing the second FC processing block providing in the output the last filtered samples of the first OFDM symbol block. The aforementioned additional wait time may be considerably smaller in the case of discontinuous FC processing (e.g., with overlap factor of 0.5) compared to continuous FC processing. In the case of maximal timing adjustment flexibility (see detailed discussion below), the number of samples collected from the following CP-OFDM symbol time corresponds to the number of overlapping samples at the end of FC processing block. In addition, in discontinuous processing, the FC processing blocks of a first OFDM symbol block may be processed independently from the following FC processing blocks of a second OFDM symbol block. This type of parallel processing is not possible with continuous processing as two consequent OFDM symbol blocks are linked through common samples due to the FC processing blocks not being synchronized with the OFDM symbol blocks. In other words, in embodiment where the one or more subsequent OFDM symbol blocks comprise at least two subsequent OFDM symbol blocks the waveform processing device may be configured to process one or more odd OFDM symbol blocks of the at least two subsequent OFDM symbol blocks separately and in parallel with one or more even OFDM symbol blocks of the at least two subsequent OFDM symbol blocks.

Because the content (e.g., FC block containing first or second half of an OFDM symbol) and processing of odd and even FC processing blocks remain constant over the whole received signal, odd and even signal blocks may be processed separately from each other. Thus, in some embodiments odd and even FC processing blocks are processed in parallel FC processing chains which allows minimizing the latency of the receiver. This parallel processing may be easily generalized also for the embodiments where each OFDM symbol block is segmented into three or more FC processing blocks as discussed above. In other words, the waveform processing device may be configured to process one or more odd signal blocks (i.e., one or more odd FC processing blocks) of the pre-defined number of partially overlapping signal blocks separately and in parallel with one or more even signal blocks (i.e., one or more even FC processing blocks) of the pre-defined number of partially overlapping signal blocks.

If a large overlap factor (e.g., 0.5) is used, most of the samples in the overlapping parts are not severely distorted during the FC processing. Therefore, the overlapping samples may be utilized, in some embodiments, for secondary functions, e.g., for timing adjustment. The timing of filtered signal blocks (before discarding the overlapping samples) in each subband may be separately adjusted after the discontinuous FC processing (e.g., between blocks 504 and 505 of FIG. 5) by using the extra samples available in the overlapping sections of the filtered signal blocks. The timing adjustment is based on tuning individually for each subband the position of the transform window (e.g., FFT window) of the receiver OFDM processing stage (e.g., corresponding to elements 313, 314, 315 of FIG. 3B). For signals arriving too early, the used extra samples are overlapping samples preceding non-overlapping samples in the first signal block of an OFDM symbol block. For signals arriving too late, the used extra samples are the overlapping samples following non-overlapping samples in the second signal block of the OFDM symbol.

According to an alternative embodiment for enabling timing adjustment, the timing of each subband may be adjusted individually by introducing additional weights corresponding to delays in time domain to the subband-specific transform-domain windows (e.g., in block 503 of FIG. 5). Both of the aforementioned approaches for timing adjustment enable similar benefits when receiving multiple subbands with significantly increased timing offsets. The timing adjustment may be especially beneficial in communication where relaxed synchronization accuracy is allowed, e.g., in mMTC (massive Machine Type Communications). It should be noted that the amount of timing adjustment in the case of late arrival depends on the number of overlapping samples which are collected in the FC processing input from the following CP-OFDM symbol block.

As the discontinuous receiver-side FC processing is synchronized to OFDM symbol blocks, the support for multi-numerology (i.e., reception of OFDM symbol blocks having multiple different lengths and using different SCS) is not as simple as with continuous processing. In a basic approach according to embodiments, separate FC engines or FC processing chains as illustrated in FIG. 4 are arranged for each numerology and for each FC engine the input FC blocks per numerology are built from the input sample sequence in an OFDM-symbol-synchronized manner, where the OFDM symbol duration in samples depends on the assumed SCS. This approach allows to use simplified computations for each numerology.

Another approach according to embodiments is to build the FC processing blocks based on a baseline SCS and to separate all subbands with different numerology during the FC processing. This is enabled by 5G NR, thanks to the time-domain alignment of OFDM symbols having different SCSs. This process is illustrated in FIG. 6 assuming the lowest SCS (15 kHz in this case) as the baseline SCS.

Figure 6:
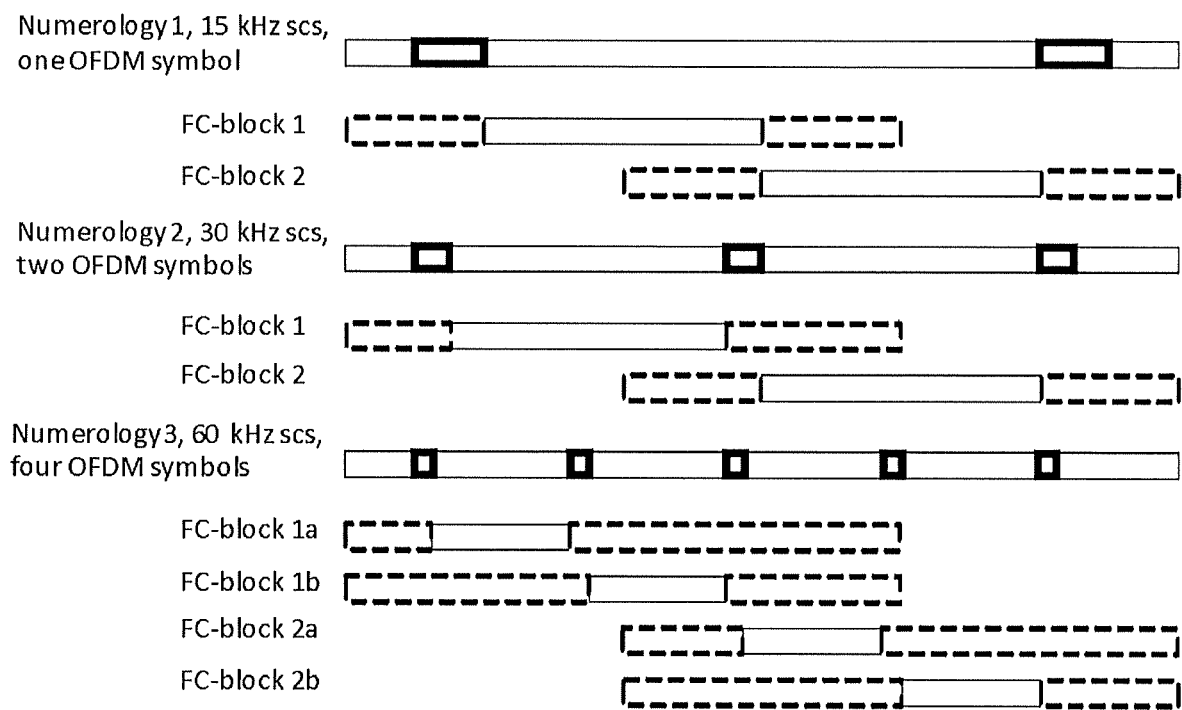
FIG. 6 illustrates an example of handling multiple numerologies according to embodiments.

Referring to FIG. 6, useful parts (i.e., the useful data content) of each signal block (i.e., each OFDM symbol block and each FC processing block) are drawn with thin solid lines, cyclic prefixes are drawn with thick solid lines and overlapping (unused) parts are drawn with dashed lines. The FC processing blocks drawn under corresponding OFDM symbol block (corresponding to numerologies 1, 2 and 3 and respective SCSs of 15 kHz, 30 kHz and 60 kHz) illustrate signal blocks at the input of the long FFT transform in the FC processing (i.e., they correspond to blocks 405 to 408 of FIG. 4). The FC processing blocks for numerology 1 (i.e., FC-block 1 and FC-block 2 on the top of FIG. 6) are segmented and aligned similar to as depicted in FIG. 4 while the segmentation and alignment for the FC processing blocks of numerologies 2 and 3 corresponding to higher SCS is modified. The FC processing blocks are in fixed positions for all numerologies, while the useful parts are aligned with the OFDM symbol locations in each numerology. For numerologies 2 and 3, each OFDM symbol block corresponds simply to a single FC processing block.

If the length of the cyclic prefix has an integer value at the output rate of a subband, the OFDM symbol alignment can be done by selecting the needed samples at the output of the respective FC processing branch. If this is not the case, then the fractional sample alignment can be done by modifying the transform-domain (e.g., frequency domain) window or weight mask of a subband.

If the length of the cyclic prefix does not have an integer value as in the case of numerology 3, the OFDM symbol blocks corresponding to the same FC processing block (e.g., blocks 1*a* and 1*b*) need to be processed separately in the waveform processing device using different transform-domain windows and separate (first) inverse transforms (e.g., IFFTs). Alternatively, it may be possible to compensate the different delays of different OFDM symbols at the OFDM equalization stage if the delay information is included in the equalization weights.

After filtering (i.e., after block 409 of FIG. 4 or block 505 of FIG. 5), the waveform processing device may be configured to perform for each subband with SCS different than the baseline SCS dedicated resampling or concatenation to collect proper OFDM symbols from the subband-wise output signal. It should be noted that in this case only the cyclic prefixes of the baseline SCS are fully discarded, whereas for other SCSs a part of the cyclic prefixes are filtered in the process.

The example illustrated in FIG. 6 holds for all 15 kHz OFDM symbol blocks with a short normal cyclic prefix (e.g., for 6 latter OFDM symbol blocks in a 0.5 ms time window comprising 7 OFDM symbol blocks). However, for the initial OFDM symbol block in a time window the cyclic prefix may be slightly expanded compared to the cyclic prefixes in the subsequent OFDM symbol blocks. This may carry over to the initial FC processing blocks of each numerology which may also have an expanded cyclic prefix. Otherwise, similar processing as described above may still be applied in this case.

In the general case with multiple numerologies according to embodiments, the waveform processing device may be configured to perform a process as described in this paragraph. In response to the input signal comprising, in addition to the one or more subsequent OFDM symbol blocks corresponding to a first numerology and a first subcarrier spacing (e.g., numerology 1 in FIG. 6), one or more sets of one or more secondary OFDM symbol blocks, each set corresponding to a different second numerology with a different second subcarrier spacing larger than the first subcarrier spacing (e.g., numerologies 2 and 3 in FIG. 6), the waveform processing device performs the segmenting (corresponding to element 404 of FIG. 4), the filtering (corresponding to element 409 of FIG. 4 and/or FIG. 5) and the combining (corresponding to elements 414, 415 of FIG. 4) normally for the one or more subsequent OFDM symbols corresponding to the first numerology and performs the following for each set of one or more secondary OFDM symbol blocks. First, the waveform processing device segments the one or more secondary OFDM symbol blocks to secondary signal blocks having a length equal to and being aligned with the one or more partially overlapping signals blocks of the first numerology. Each secondary signal block comprises at least one OFDM data block of the one or more secondary OFDM symbol blocks. Second, the waveform processing device filters each secondary signal block by applying at least a second transform-domain window function. The filtering may be performed in a similar manner as discussed in relation to FIG. 5. However, the second transform-domain window function may be defined and applied, in contrast to the first transform-domain window function, not only subband-specifically but also numerology-specifically. Finally, the waveform processing device resamples filtered secondary signal blocks to produce two or more filtered secondary OFDM data blocks for each subband and numerology.

In some scenarios, it may be beneficial to obtain a continuous signal response in the output of the discontinuous receiver (Rx) FC processing (i.e., output of the waveform processing device according to embodiments). One such scenario in LTE and 5G NR uplink is when long PRACH (Physical Random Access CHannel) sequences are used as these signals can extend over several Rx symbol and slot durations. The solution to getting a continuous response, according to embodiments, is simply to configure the waveform processing device to collect the missing cyclic prefix samples needed for constructing the continuous output signal from the overlapping parts of selected FC processing blocks. Alternatively, the waveform processing device may be configured to average the output signal over two FC processing blocks carrying samples related to the missing cyclic prefix section. It should be noted that the cyclic prefix is assumed only for the input signal and the actual subband signal may be of any type, with or without a cyclic prefix. If the missing cyclic prefix samples in the subband-wise output rate are not of integer length, the fractional delays need to be compensated in the subband-wise transform-domain windowing.

Figure 7:
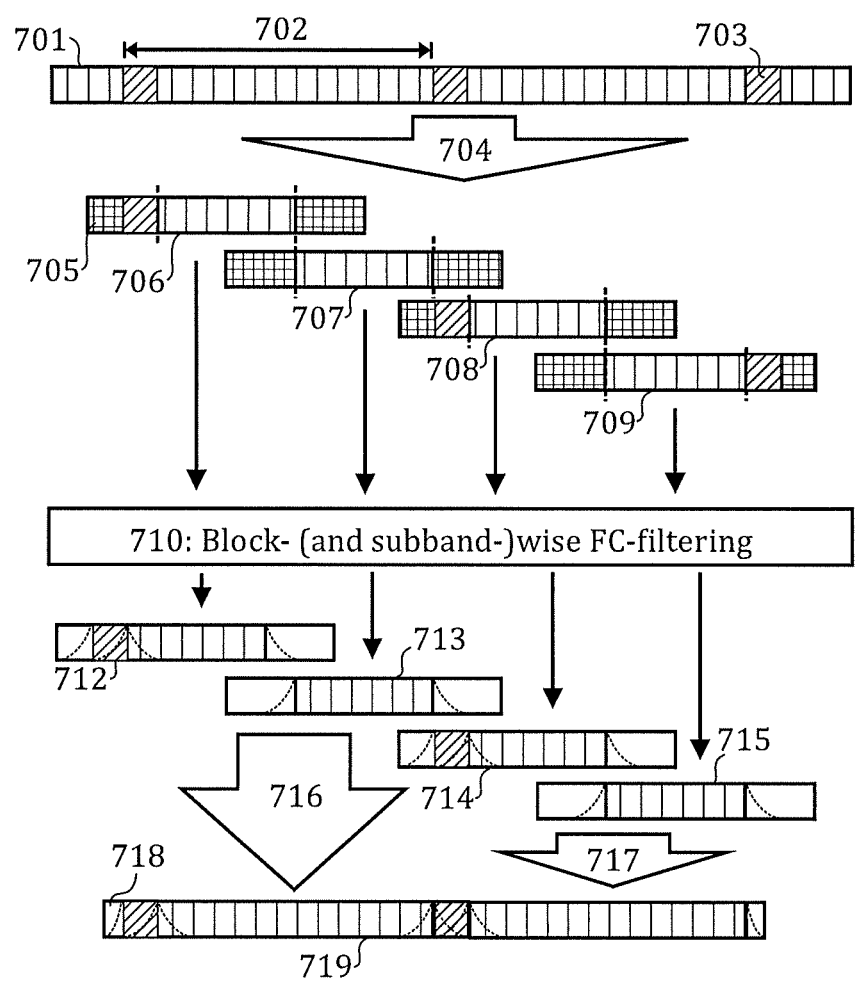
FIGS. 7 to 11, 12A and 12B illustrate exemplary processes according to embodiments.

A similar discontinuous waveform processing scheme (or specifically FC processing scheme) as discussed in relation to FIGS. 4 and 5 for the receiver side may be implemented also on the transmitter-side. The same process may be carried out in parallel for multiple subbands of the OFDM signal to be transmitted. In FIG. 7, the FC processing scheme according to the embodiment is demonstrated for a mini-slot of two (CP-)OFDM symbols. In other embodiments, a (mini-)slot of one or more OFDM symbol blocks may be processed. The transmitter-side waveform processing scheme may be performed by a waveform processing device (e.g., a filter, a filter bank or a filtering engine) which may correspond to the filtering element 304 of FIG. 3A for a subband.

Referring to FIG. 7, the element 701 corresponds to an input signal comprising two subsequent OFDM symbol blocks 702 before filtering. In the general case according to embodiments, a received input signal may comprise one or more (subsequent) OFDM symbol blocks. Each OFDM symbol comprises a cyclic prefix 703 and may correspond to a certain subband. The received input signal may correspond to a signal generated by a conventional (CP-)OFDM transmitter (Tx) processing unit. The CP-OFDM signal for subband m may be generated by using the smallest IFFT size equal to or larger than $L_{OFDM,m}$ supporting an integer-length cyclic prefix. For example, to generate a 1 PRB subband signal assuming an IFFT size of 16 for the generation of the OFDM symbol block and a FFT size of 16 for the first orthogonal transform, the sampling rate may be selected to be as low as 240 kHz (compared to 1.92 MHz required with the (I)FFT size of 128). Alternatively, the CP-OFDM signal may be generated so that the length of the cyclic prefix is equal to the largest integer number of samples mapping into a higher rate cyclic prefix of a pre-determined value to be included in the transmitted signal. Then, the low-rate cyclic prefix may have been added to each OFDM symbol and the signal may have been converted to serial format to produce the input signal 701.

After the OFDM signal is received, the waveform processing device segments, in element 704, each OFDM symbol block of the input signal into a pair of two zero-padded signal blocks 706, 707, 708, 709 so that non-zero samples of a first signal block 706, 707 in each pair correspond to the cyclic prefix and a first half of an OFDM data block (following the cyclic prefix) and non-zero samples of a second signal block 406, 408 in each pair correspond to a second half of the same OFDM data block. Thus, the resulting parallel signal blocks 706, 707, 708, 709 are synchronized with the OFDM symbol blocks. A pre-defined number of samples having a zero value 705 (denoted by a rectangular mesh pattern) are inserted to each end of each signal block 706, 707, 708, 709 (i.e., before and after the cyclic prefix and/or OFDM data block samples). The pre-defined number of samples having a zero value 705 may be defined to be $L_{zero}$ for ends of signal blocks 706, 707, 708, 709 without a cyclic prefix and $L_{zero}$-$N_{CP}$ for ends of signal blocks 705, 707 having a cyclic prefix. The overlapping sections may be defined, also in this case, using an overlapping factor. As the cyclic prefix is considered a part of the non-overlapping section of the first signal block in the transmitter-side implementation (as it is to be included in the transmitted signal), the overlapping factor may be defined differently for the first and second signal blocks. Namely, the overlap factor may be 0.5-$N_{CP}/N_{1st}$ for the first signal block of the pair and 0.5 for the second signal block of the pair. Here, $N_{CP}$ is a length of the cyclic prefix (in samples) and $N_{1st}$ is a length of the first signal block.

The waveform processing device filters, in block 710, each signal block in each pair by applying at least a first transform-domain window function, wherein the first transform-domain window function may be defined and applied subband-specifically. The overlapping sections of the filtered signal blocks 712, 713, 714, 715 have non-zero values as illustrated in FIG. 7 due to the fact that a linear convolution of a sequence (implemented here as the subband-wise multiplication in the transform domain) always results in a sequence longer than the original sequence. The input signals 706, 707, 708, 709 of block 710 typically correspond to a relatively low sampling rate while the filtering process of block 710 may produce output signals 712, 713, 714, 715 having a considerably higher sampling rate (e.g., over 50 times higher). A more detailed description of this implementation of block 710 is discussed in relation to FIG. 7. In other embodiments, other filtering techniques (e.g., WOLA) may be employed.

The waveform processing device combines, in elements 716, 717, the filtered signal blocks to produce an output signal 719 comprising two or more filtered OFDM symbol blocks for the subband. Each filtered OFDM symbol block comprises a filtered cyclic prefix and a filtered OFDM data block. Any overlapping sections of subsequent filtered signal blocks may be added together at this stage according to overlap-and-add processing. Moreover, the spacing of the subsequent filtered OFDM data blocks may be adjusted, in elements 716, 717, (with the precision of the output sampling interval) to correspond to a first pre-defined cyclic prefix duration. The adjustment may be achieved by extrapolating the cyclic prefix using overlapping samples of filtered signal blocks and/or by interpolating the cyclic prefix (i.e., original, low-rate cyclic prefix). Moreover, the cyclic prefix of at least one filtered OFDM symbol block may be further extended, in elements 716, 717, to match to a second pre-defined cyclic prefix duration longer than the first cyclic prefix duration. This additional extension may also be achieved by extrapolating the cyclic prefix by using at least one overlapping sample of a corresponding filtered signal block and/or by interpolating the cyclic prefix of a corresponding input signal. Specifically, the filtered cyclic prefix of a first filtered OFDM symbol block may be extended by a pre-defined amount 718 compared to other filtered cyclic prefixes. As discussed above, the low-rate non-filtered cyclic prefix may be tuned so that the pre-determined length is reached for the filtered cyclic prefix. In addition or instead, additional samples from the filtered signal blocks may be used to extrapolate the filtered cyclic prefix (in addition to the interpolation resulting from block 710) in order to meet the pre-determined desired length. The output signal 719 for different subbands of the OFDM signal to be transmitted may be subsequently combined with each other before transmission in a separate process or also in elements 716, 717.

Similar to as was discussed in relation the receiver-side embodiments, in some transmitter-side embodiments each generated OFDM symbol block (i.e., each input signal 701 of FIG. 7) may be segmented, in a general case, into a set of a pre-defined number (i.e., two or more) of partially overlapping signal blocks of equal length. Specifically, the waveform device may segment each OFDM symbol block of the one or more input signals into a set of a pre-defined number of partially overlapping signal blocks having equal length and being zero-padded from both sides to achieve the overlapping. Here, a first (i.e., initial) signal block in each set comprises the cyclic prefix and non-zero (i.e., non-overlapping) samples of the pre-defined number of zero-padded signal blocks in each set comprise, in combination, the OFDM symbol block (i.e., the cyclic prefix and the OFDM data block). The further definitions given in relation to FIG. 4 regarding the more general synchronized segmentation apply as such also for the transmitter side.

In some embodiments, some subbands of the OFDM symbol blocks may correspond to different numerologies.

The aforementioned embodiments relating to the transmitter-side are suitable for scenarios where the overall symbol durations for all subband signals to be transmitted have equal lengths and the symbols are synchronized. In some embodiments, different cyclic prefix durations (in practice, different cyclic prefix lengths) are allowed for different CP-OFDM symbol intervals within a transmission slot.

Many of the benefits discussed for the receiver-side discontinuous FC processing compared to the conventional continuous FC processing and/or time-domain processing apply also to transmitter-side discontinuous FC processing (e.g., discontinuous FC processing enabling parallel processing for FC processing blocks). However, it should be noted that due to the fact that overlap-and-add processing may be used in the transmitter-side, there is no need to wait for any samples of the following OFDM symbol block in the transmitter-side discontinuous FC processing. Therefore, considerable reduction in latency may be achieved compared to continuous transmitter-side FC processing.

Figure 8:
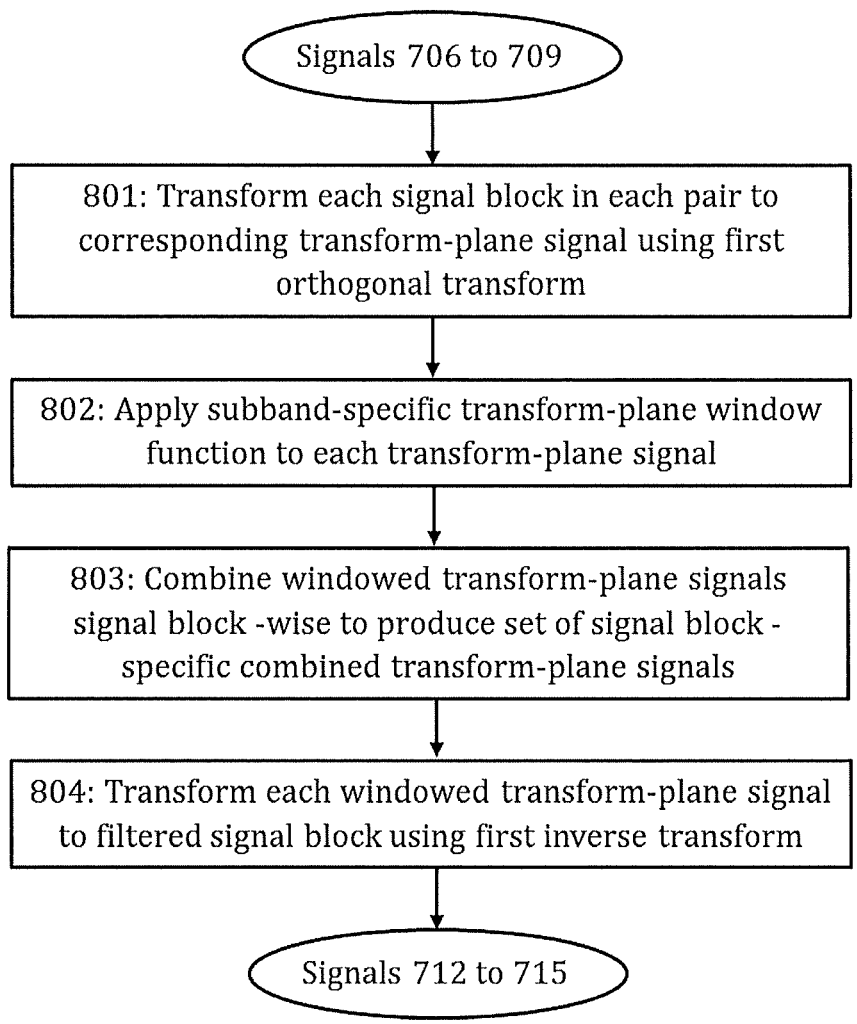

FIG. 8 illustrates a process for performing the filtering in block 710 according to an exemplary embodiment. The illustrated process corresponds to fast convolution processing with a single transform-domain window for a single subband. In other embodiments, one or more additional transform-domain and/or time-domain windows may be applied. Moreover, similar filtering may be carried for other subbands of the OFDM signal in a parallel process.

Referring to FIG. 8, the waveform processing device transforms, in block 801, each signal block 806, 807, 808, 809 in each pair (corresponding to first and second halves of an OFDM symbol) to a corresponding transform-domain signal using the first orthogonal transform (as defined in relation to FIG. 5). Then, the waveform processing device applies, in block 802, the transform-domain window function to each transform-domain signal. The transform-domain window function may be defined independently for each subband. The waveform processing device combines, in block 803, windowed transform-plane signals corresponding to different subbands but same signal blocks to produce a set of signal block-specific combined transform-plane signals. Finally, the waveform processing device transforms, in block 804, each combined transform-domain signal to a filtered signal block using a first inverse transform, where the first inverse transform is an inverse transform of the first orthogonal transform. The length of the first inverse transform may be much larger than the length of the first orthogonal transform. The first inverse transform may be defined to be the same for all the subbands while the first orthogonal transform may have a subband-specific definition. The process of FIG. 8 results in signal blocks defined for a particular subband corresponding to the filtered signal blocks 712, 713, 714, 715 of FIG. 7.

Figure 9:
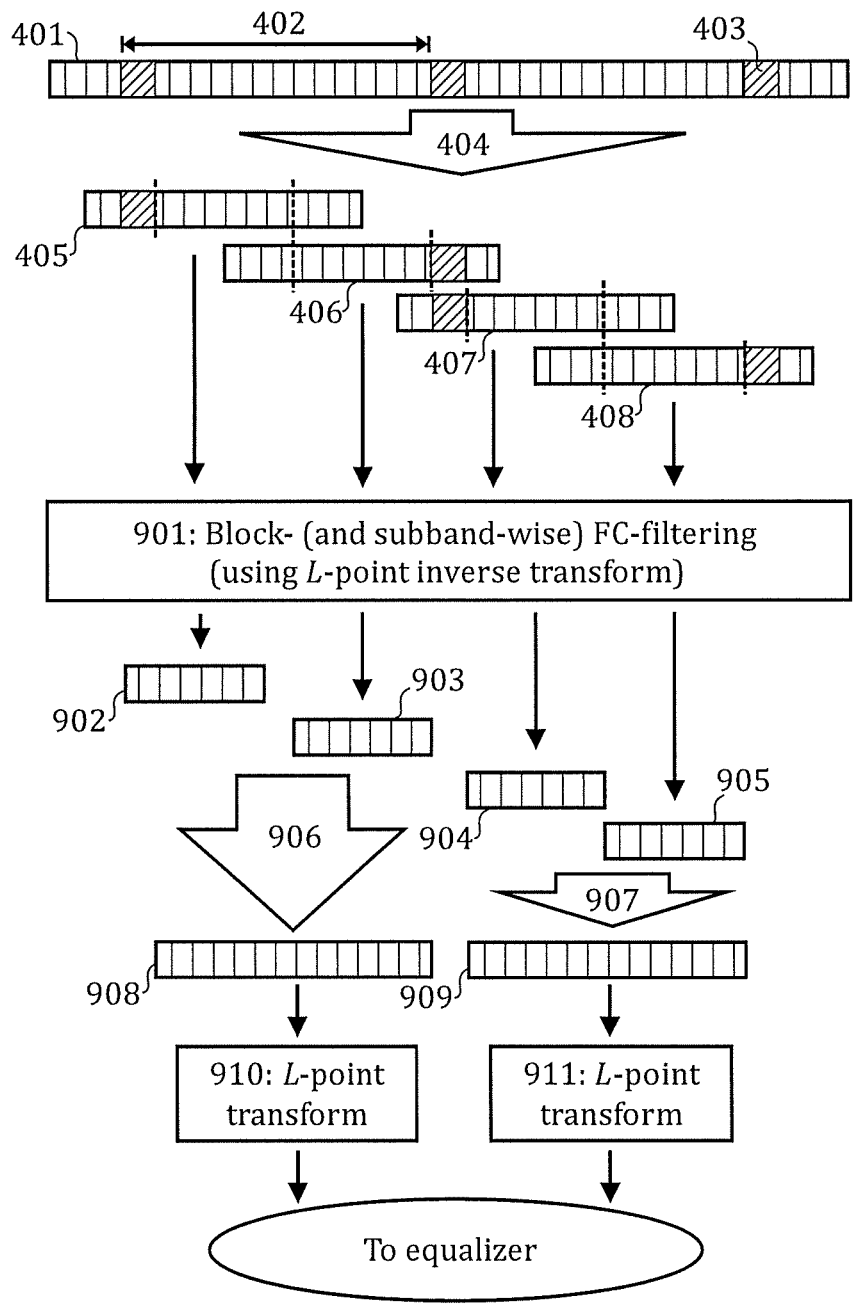

In a conventional receiver, the FC-based processing (or other filtering) stage is followed by an OFDM receiver processing stage and specifically an orthogonal transform (typically, a FFT) of the OFDM receiver processing stage. According to some embodiments, the filtering stage and the orthogonal transform of the OFDM receiver may be combined into joint processing solution. A basic structure for joint processing of the FC-based filter and the FFT of OFDM receiver is illustrated in FIG. 9 for the case of two FC processing blocks per OFDM symbol block. FIG. 9 mostly corresponds to FIG. 4 with elements 401 to 408 being shared by both illustrated embodiments. Moreover, elements 901 to 909 may also correspond to blocks 409 to 417 though it is assumed here that block 901 comprises blocks 501 to 504 or 505 of FIG. 5 where the length of the first orthogonal transform performed in block 504 is L. The difference between FIG. 9 and FIG. 4 is that after the filtered OFDM data blocks 908, 909 are formed, they are transformed using a second orthogonal transform (e.g., a FFT) which may also have the length L (similar to the first orthogonal transform) to transform-domain (e.g., frequency domain). Further, L may be selected such that it is able to contain all active subcarriers per subband and transition band bins used in the transform-domain windowing performed in block 901. The resulting filtered transform-domain signals each corresponding to an OFDM symbol (at a particular subband) may be fed to a frequency-domain (channel) equalizer. In these embodiments, the overlapping factor may be 0.5.

Figure 10:
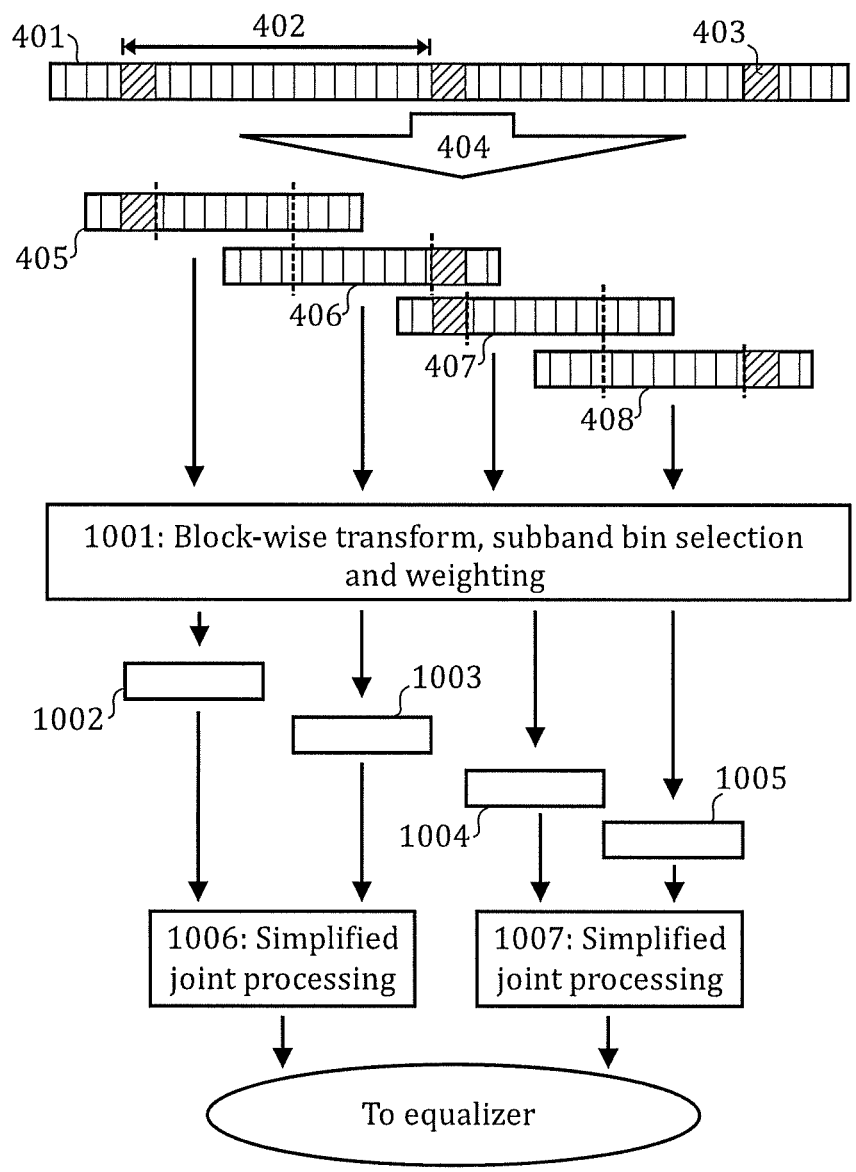

While the basic joint processing solution illustrated in FIG. 9 provides due to the filtering stage utilizing discontinuous processing (i.e., elements 401 to 408 and 901) a simpler solution in terms of number of calculations compared to a corresponding continuous processing-based solution, even larger reduction in the computational complexity may be achieved if the processes of the first inverse transform (block 504 of FIG. 5 comprised in block 901), combining the FC processing blocks (elements 906, 907) and the second orthogonal transform (elements 908, 909) are combined into a simplified joint process. This concept is illustrated in FIG. 10 for the case of two FC processing blocks per OFDM symbol block. In FIG. 10, block 1001 may correspond to blocks 501 to 503 of FIG. 5. Therefore, the simplified joint processing unit 1006, 1007 takes as its input both filtered (or windowed) transform-domain signals 1002, 1003, 1004, 1005 and provides as its output, similar to the basic joint processing in FIG. 9, filtered combined transform-domain signals, each corresponding to an OFDM symbol (at a particular subband), to be fed to a frequency-domain (channel) equalizer.

The simplified joint processing unit 1006, 1007 of the simplified discontinuous Rx FC processing scheme illustrated in FIG. 9 may be implemented using two alternative structures according to embodiments. Both of said structures are limited to Fourier transforms (i.e., DFT, IDFT, FFT and IFFT). In the following examples, FFT/IFFT is used.

Figure 11:
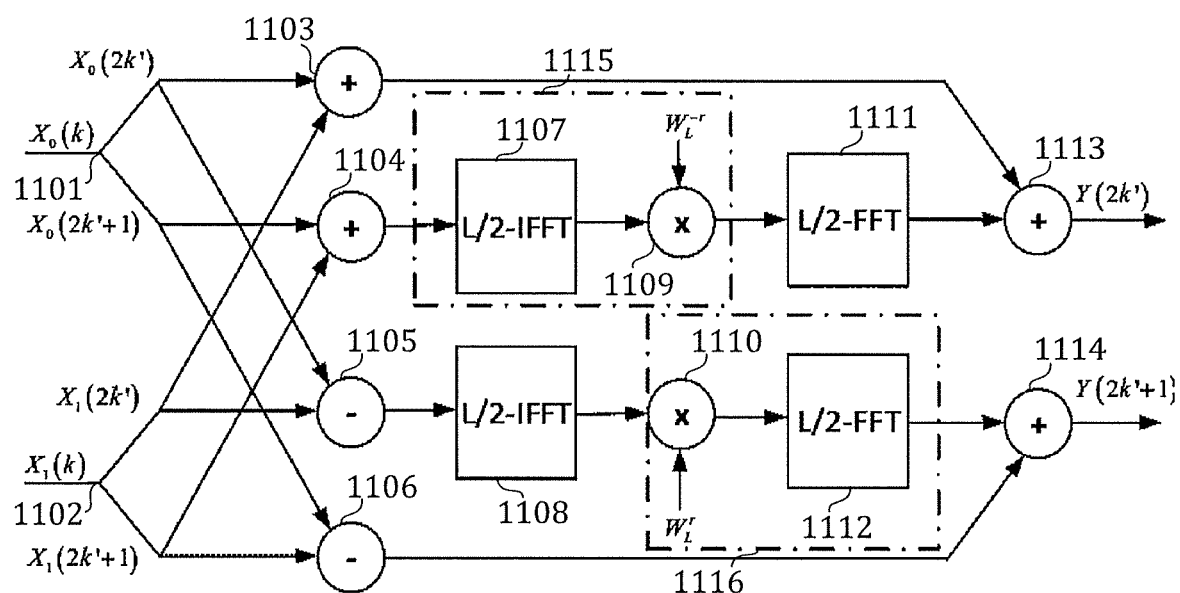

The first alternative joint processing unit of the waveform processing device is illustrated in FIG. 11. In FIG. 11, three transforms of length L (i.e., two parallel IFFTs followed by an FFT) in the basic joint processing of FIG. 9 are replaced by four transforms (of length L/2) and some additional twiddle factors of the (I)FFTs using a radix-2 decomposition.

Referring FIG. 11, the windowed frequency-domain signals which the simplified joint processing unit takes as its input are denoted by $X_0(k)$ and $X_1(k)$ corresponding, respectively, to the former transform-domain signal (corresponding to signals 1002, 1004 of FIG. 10) and the latter transform-domain signal (corresponding to signals 1003, 1005 of FIG. 10). Here, k denotes a frequency index for the particular subband having values k=0, 1, . . . , L-1. The joint processing unit divides, in elements 1101, 1103, each windowed frequency-domain signal in the pair $X_0$, $X_1$ to an even frequency-domain signal $X_0(2k')$, $X_1(2k')$ and an odd frequency-domain signal $X_0(2k'+1)$, $X_1(2k'+1)$. The even frequency-domain signal comprises even samples of a corresponding windowed frequency-domain signal and the odd frequency-domain signal comprises odd samples of the corresponding windowed frequency-domain signal. Here, k' denotes a decimated frequency index for the particular subband having values k'=0, 1, . . . , L/2-1.

The simplified joint processing unit calculates, in elements 1103, 1105, a sum and a difference of even frequency-domain signals $X_0(2k')$, $X_1(2k')$ in the pair to form an even sum frequency-domain signal $X_0(2k')+X_1(2k')$ and an even difference frequency-domain signal $X_0(2k')-X_1(2k')$. Furthermore, the simplified joint processing unit calculates, in elements 1104, 1106, a sum and a difference of odd frequency-domain signals $X_0(2k'1)$, $X_1(2k'+1)$ in the pair to form an odd sum frequency-domain signal $X_0(2k'1)-X_1(2k'1)$ and an odd difference frequency-domain signal $X_0(2k'1)-X_1(2k'1)$.

After forming the odd and even sum and difference signals, the simplified joint processing unit transforms, in blocks 1107, 1108, the odd sum frequency-domain signal to an odd sum signal block (i.e., a corresponding time-domain signal) and the even difference frequency-domain signal to an even sum signal block using a first inverse transform (i.e., an IDFT or IFFT). The first inverse transform is an inverse transform of the first orthogonal transform used in the previous filtering. Each first inverse transform may have a length of L/2. After the generation of time-domain signals, the simplified joint processing unit multiplies, in elements 1109, 1110, the odd sum signal block with a first twiddle factor $W_L^{-n}$ and the even difference signal block with a second twiddle factor $W_L^n$, respectively. The first twiddle factor and the second twiddle factor are defined, respectively, as:

$$W_L^{-r} = \exp(-2j\pi/L^*(-r)) \text{ and } W_L^R = \exp(-2j\pi/L^*(r)),$$

wherein j is the imaginary unit and r is a time index having values r=0, 1, . . . , L/2-1. The simplified joint processing unit transforms, in blocks 1111, 1112, each multiplied signal block to a corresponding frequency-domain signal using a second orthogonal transform (i.e., a FFT or DFT) to form a modified odd sum frequency-domain signal and a modified even difference frequency-domain signal, respectively.

In some embodiments, a length of each windowed frequency-domain signal (i.e., $X_0(k)$ and $X_1(k)$) is equal to a length of the second orthogonal transform multiplied by two and/or to a length of the first inverse transform multiplied by two.

To produce OFDM subcarrier samples for channel equalization, the simplified joint processing unit calculates, in elements 1113, 1114, a sum of the modified odd sum frequency-domain signal and the even sum frequency-domain signal to form even OFDM subcarrier samples Y(2k') and a sum of the modified even difference frequency-domain signal and the odd difference frequency-domain signal to form odd OFDM subcarrier samples Y(2k'+1).

Figure 12A:
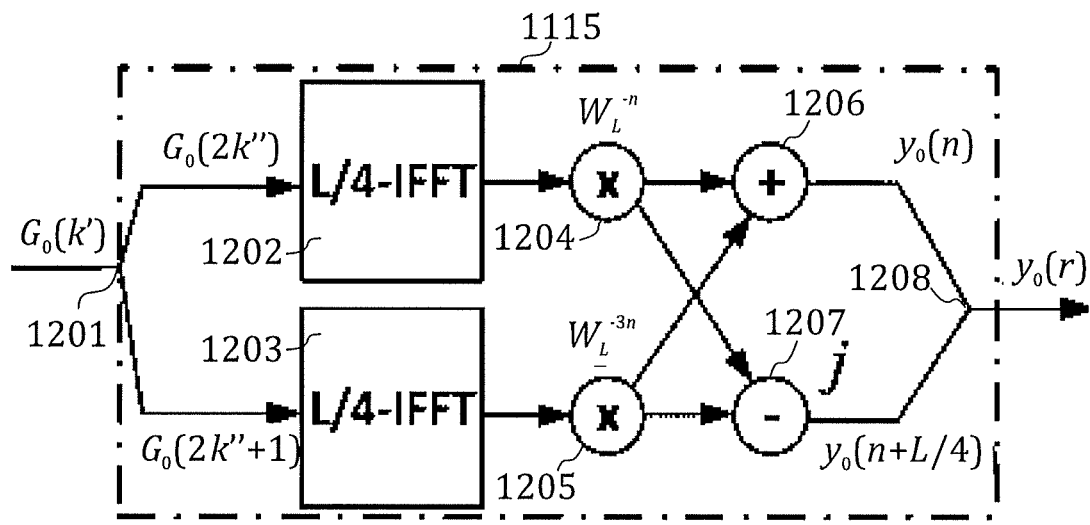
Figure 12B:
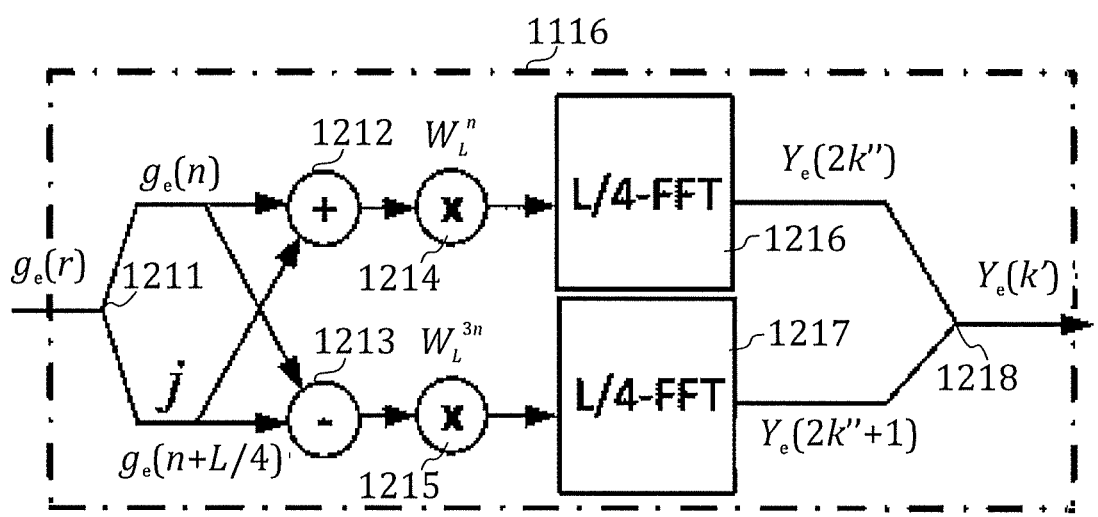

The simplified joint processing unit illustrated in FIG. 11 may be further simplified by decomposing, using a first and a second radix-2 decomposition, one of the L/2-length IFFT (or IDFT) and one of the L/2-length FFT (or IDFT) into two L/4-length transforms each and combining the separate twiddle factors with the twiddle factors appearing in the radix-2 decompositions. This further simplification of the simplified joint processing unit according to embodiments is illustrated in FIGS. 12A and 12B which show, respectively, the first and second radix-2 decompositions for the elements 1115, 1116 of FIG. 11. In some embodiments, only one of said first and second radix-2 decompositions may be employed.

FIG. 12A illustrates the first radix-2 decomposition carried out for the element 1115 of FIG. 11 comprising the orthogonal transform 1107 and the multiplication by the first twiddle factor 1109. In FIG. 12A, the odd sum frequency-domain signal $X_0(2k'+1)+X_1(2k'+1)$ from the summing element 1104 is denoted as $G_0(k')$. The simplified joint processing unit divides, in element 1201, the odd sum frequency-domain signal $G_0(k')$ to an even-odd sum frequency-domain signal $G_0(2k'')$ and an odd-odd sum frequency-domain signal $G_0(2k''+1)$. Here, k" denotes a decimated frequency index for the particular subband having values k"=0, 1, . . . , N/4-1. The even-odd sum frequency-domain signal $G_0(2k'')$ comprises even samples of the odd sum frequency-domain signal and the odd-odd sum frequency-domain signal $G_0(2k''+1)$ comprises odd samples of the odd sum frequency-domain signal. Then, waveform processing device transforms, in elements 1202, 1203, the even-odd sum frequency-domain signal to an even-odd sum signal block (i.e., a time-domain signal) and the odd-odd sum frequency-domain signal to an odd-odd sum signal block using a second inverse transform (i.e., a IFFT or IDFT). The length of the second inverse transform is L/4.

After the conversion to time-domain, the waveform processing device multiplies, in elements 1204, 1205, the even-odd sum signal block with a third twiddle factor and the odd-odd sum signal block with a fourth twiddle factor, respectively. The third twiddle factor and the fourth twiddle factor are defined, respectively, as:

$$W_L^{-n}=\exp(-2j\pi/L^*(-n)) \text{ and}$$

$$W_L^{-3n}=\exp(-2j\pi/L^*(-3n)).$$

where n is the time index having values n=0, 1, . . . , L/4−1.

The waveform processing device calculates, in elements 1206, 1207, a sum and a difference of multiplied even-odd and odd-odd sum signal blocks, respectively. Then, the waveform processing device multiplies the calculated difference signal block $y_0(n+L/4)$ with the imaginary unit j and concatenates, in element 1208, the calculated sum signal block $y_0(n)$ and the calculated difference signal block which has been multiplied with the imaginary unit. Here, the time index n has values n=0, 1, . . . , L/4−1. The resulting time-domain signal block, denoted in FIG. 12A as $y_0(r)$, corresponds to the signal block multiplied with the first twiddle factor. Here, r is a time index having values r=0, 1, . . . , L/2−1.

FIG. 12B illustrates the second radix-2 decomposition carried out for the element 1116 of FIG. 11 comprising the multiplication by the second twiddle factor 1110 and the orthogonal transform 1112. The second radix-2 decomposition is similar to the first radix-2 decomposition though the operations are performed in an opposite order.

In FIG. 12B, the even difference signal block produced by the second inverse transform 1108 is denoted as $g_e(r)$. First, the simplified joint processing unit segments, in element 1211, the even difference signal block to a first half of the even difference signal block $g_e(n)$ and a second half of the even difference signal block $g_e(n+L/4)$. Subsequently, the second half of the even difference signal block $g_e(n+L/4)$ is multiplied by an imaginary unit j. The simplified joint processing unit calculates, respectively in elements 1212, 1213, a sum and a difference of the first half of the even difference signal block and the second half of the even difference signal block multiplied with the imaginary unit and multiplies, in elements 1214, 1215, the summed first and second halves with a fifth twiddle factor $W_L^n$ and the subtracted first and second halves with a sixth twiddle factor $W_L^{3n}$. The fifth twiddle factor and the sixth twiddle factor are defined, respectively, as:

$$W_L^n=\exp(-2j\pi/L^*(n)) \text{ and}$$

$$W_L^{3n}=\exp(-2j\pi/L^*(3n)).$$

After applying the fifth and sixth twiddle factors, the simplified joint processing unit transform, in elements 1216, 1217, the signal blocks multiplied with the fifth and sixth twiddle factors using a third orthogonal transform (i.e., a FFT or a DFT) having a length of L/4 to produce frequency-domain signals $Y_e(2k'')$, $Y_e(2k''+1)$, respectively. Finally, the simplified joint processing unit combines, in element 1218, frequency-domain signals associated (i.e., multiplied in time-domain with) with the fifth and sixth twiddle factors ($Y_e(2k'')$ and $Y_e(2k''+1)$, respectively). Even samples of the resulting combined frequency-domain signal $Y_e(k')$ are samples of the frequency-domain signal $Y_e(2k'')$ associated with the fifth twiddle factor and odd samples of the resulting combined frequency-domain signal $Y_e(k')$ are samples of the frequency-domain signal $Y_e(2k''+1)$ associated with sixth twiddle factor.

In some embodiments, a length of each windowed frequency-domain signal (i.e., $X_0(k)$ and $X_1(k)$) is equal to a length of the third orthogonal transform multiplied by four and/or to a length of the second inverse transform multiplied by four.

As mentioned above, by using the simplified discontinuous Rx FC processing as described in relation to FIGS. 10 and 11 the computational complexity may be reduced compared to the basic discontinuous Rx FC processing of FIG. 9. Moreover, by using the first and/or second radix-2 decompositions illustrated in FIGS. 12A and 12B in connection with the embodiment illustrated in FIG. 11 the computational complexity may be even further reduced. To give an example, assuming L=16 the rate of real multiplications is reduced by 20% compared to basic discontinuous Rx FC processing of FIG. 9 when simplified discontinuous Rx FC processing is used. If L is increased, the reduction grows steadily to about 28% with L=1024. When the first and second radix-2 decompositions are employed, the reduction is 33.3% for any L≥16. In these calculations, the (long) first orthogonal transform and multiplications related to the filtering with frequency-domain window function of the FC filter and the subcarrier equalizer weights of the OFDM receiver process were excluded.

In addition to considerable complexity reduction in terms of multiplications required, reducing the size of the used FFT transforms allows for reduced latency and memory consumption in the Rx FC filtering processing.

Figure 13:
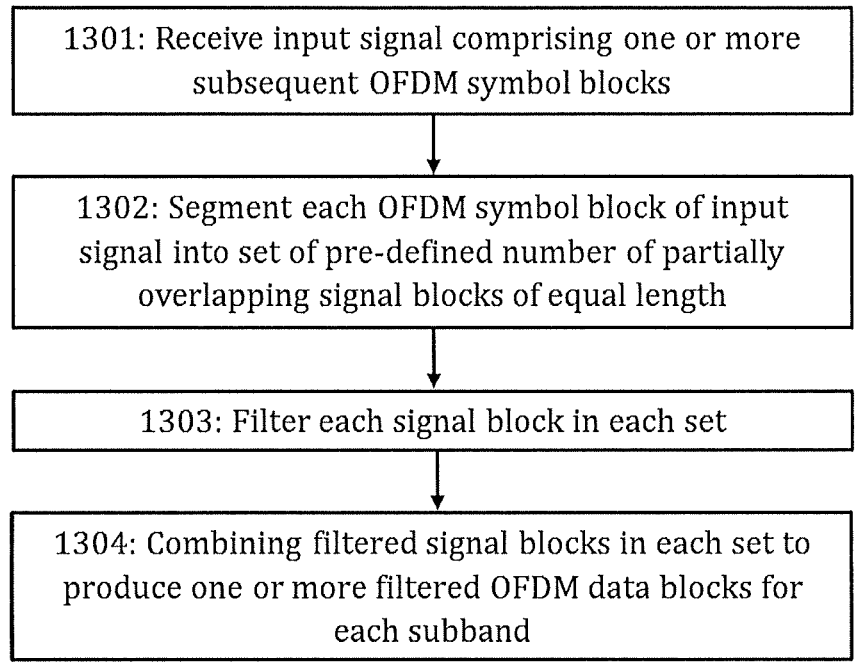
FIGS. 13 and 14 illustrate exemplary methods according to embodiments.
Figure 14:
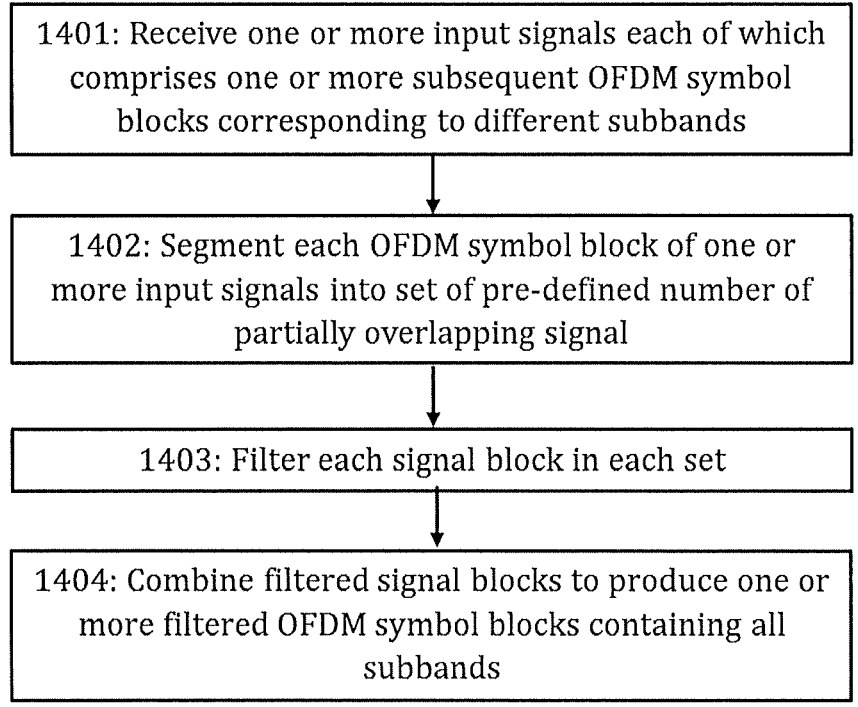

The discontinuous fast convolution-based waveform processing in the receiver- and transmitter sides according to embodiments may be implemented in a variety of ways which are not restricted to the particular examples discussed above. FIGS. 13 and 14 illustrate simplified methods according to embodiments for performing said discontinuous fast convolution-based waveform processing in receiver and transmitter-sides, respectively. Said two methods may be carried out by a waveform processing apparatus as discussed in relation to earlier embodiments and to be discussed in relation to FIG. 15 or some other apparatus. In some embodiments, one or more additional features discussed in relation to any previous embodiments may be combined with said methods.

Referring to FIG. 13, the waveform processing device receives, in block 1301, receiving an input signal comprising one or more subsequent OFDM symbol blocks each of which comprises a cyclic prefix and an OFDM data block and corresponds to one or more subbands (i.e., the input signal is spread over one or more subbands). The waveform processing device segments, in block 1302, segments each OFDM symbol block of the input signal into a set of a pre-defined number of partially overlapping signal blocks of equal length. Non-overlapping samples of the pre-defined number of partially overlapping signal blocks in each set comprise, in combination, an OFDM data block. The waveform processing device filters, in block 1303, each signal block. Finally, the waveform processing device combines, in block 1304, the filtered signal blocks in each set (e.g., using overlap-and-save processing) to produce one or more filtered OFDM data blocks for each subband.

Referring to FIG. 14, the waveform processing device receives, in block 1401, one or more input signals. Each of the one or more input signals may comprise one or more subsequent OFDM symbol blocks corresponding to different subbands. Each OFDM symbol block may comprise a cyclic prefix and an OFDM data block. The waveform processing device segments, in block 1402, each OFDM symbol block of the one or more input signals into a set of a pre-defined number of partially overlapping signal blocks having equal length. The overlapping may be achieved by zero-padding the segmented input signals from both sides. A first signal block (i.e., an initial signal block) in each set may comprise the cyclic prefix. Non-zero samples (i.e., non-overlapping samples) of the pre-defined number of zero-padded signal blocks in each set comprise, in combination, the OFDM symbol block. The waveform processing device filters, in block 1403, each (zero-padded) signal block in each set. Finally, the waveform processing device combines the filtered signal blocks (e.g., using overlap-and-add processing) to produce one or more filtered OFDM symbol blocks containing all subbands.

Figure 15:
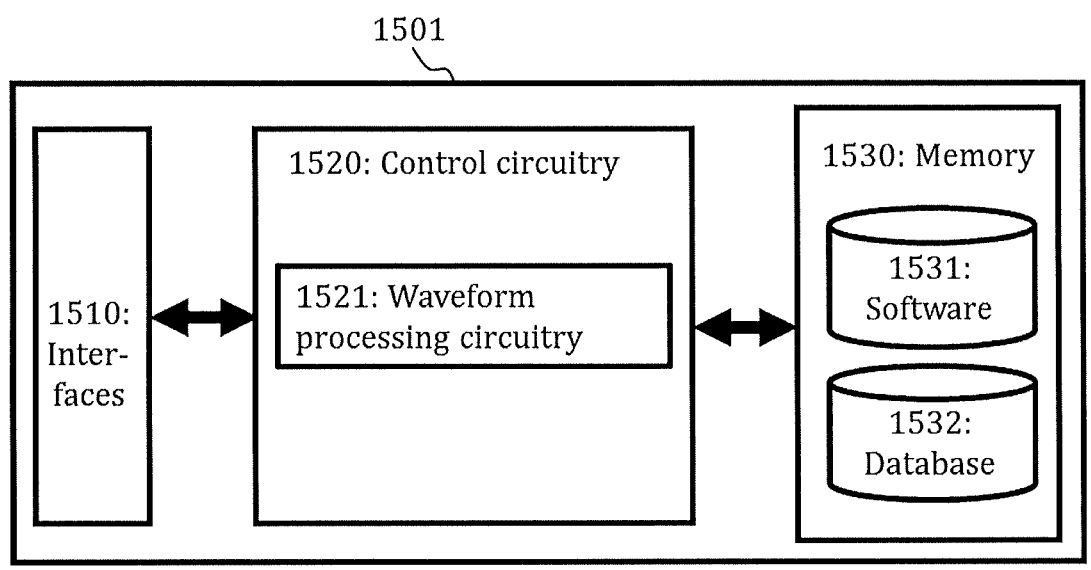
FIG. 15 illustrates an exemplary apparatus according to embodiments.

FIG. 15 illustrates an exemplary apparatus 1501 configured to carry out at least the functions described above in connection with a waveform processing device in a receiver as illustrated in any one of FIGS. 4 to 6, 9 to 11 and 12A, 12B and 13. In some embodiments, the apparatus 1501 may, instead, be configured to carry out the functions described above in connection with the receiver of FIG. 3A when the filtering element 304 is a waveform processing device as described in relation to any of FIGS. 4 to 6, 9 to 11, 12A, 12B and 13 or with the transmitter of FIG. 3B when the filtering element 312 a waveform processing device as described in relation to any of FIGS. 7, 8 and 14. The apparatus may be an electronic device comprising electronic circuitries. The apparatus may be a separate entity or a plurality of separate entities. The apparatus may comprise a control circuitry 1520 such as at least one processor, and at least one memory 1530 including a computer program code (software) 1531 wherein the at least one memory and the computer program code (software) are configured, with the at least one processor, to cause the apparatus to carry out any one of the embodiments of the waveform processing device described above.

The memory 1530 may be implemented using any suitable data storage technology, such as semiconductor based memory devices, flash memory, magnetic memory devices and systems, optical memory devices and systems, fixed memory and removable memory. The memory may comprise a database 1532 which may be or comprise the database as described in relation to previous embodiments. The memory 1530 may be connected to the control circuitry 1520 via an interface.

The apparatus may further comprise interfaces 1510 comprising hardware and/or software for realizing connectivity according to one or more communication protocols. The interfaces 1510 may comprise, for example, interfaces enabling the connections between the apparatus 1501 and other apparatuses as described, e.g., in relation to FIGS. 3A and 3B. In some embodiments, the interfaces 1510 may provide the apparatus with communication capabilities to communicate in the cellular communication system and enable communication with network nodes and terminal devices, for example. The interfaces 1510 may comprise standard well-known components such as an amplifier, filter, frequency-converter, (de)modulator, and encoder/decoder circuitries and one or more antennas.

Referring to FIG. 15, the control circuitry 1520 may comprise waveform processing circuitry 1521 configured to perform the waveform processing according to any of embodiments illustrated in FIGS. 4 to 11 and 12A, 12B, 13 and 14. The control circuitry 1520 may be configured to perform discontinuous Rx or Tx FC processing according to embodiments. Further, the control circuitry 1520 may, in some embodiments, be configured to perform OFDM Rx processing or at least some functions of OFDM Rx processing, for example, the DFT/FFT of OFDM Rx processing.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device In an embodiment, at least some of the processes described in connection with FIGS. 4 to 11, 12A, 12B, 13 and 14 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 4 to 11, 12A, 12B, 13 and 14 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 4 to 11, 12A, 12B, 13 and 14 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A waveform processing device comprising circuitry for performing:
   receiving an input signal comprising one or more subsequent orthogonal frequency division multiplexing, OFDM, symbol blocks each of which comprises a cyclic prefix and an OFDM data block and corresponds to one or more subbands;
   segmenting each OFDM symbol block of the input signal into a set of a pre-defined number of partially overlapping signal blocks of equal length, wherein non-overlapping samples of the pre-defined number of partially overlapping signal blocks in each set comprise, in combination, an OFDM data block;
   filtering each signal block in each set; and
   combining the filtered signal blocks in each set using overlap-and-save processing to produce one or more filtered OFDM data blocks for each subband.

2. A waveform processing device according to claim 1, wherein the cyclic prefix of each OFDM symbol block is comprised in a leading overlapping section of a corresponding first signal block.

3. The waveform processing device according to claim 1, wherein the pre-defined number of partially overlapping signal blocks is equal to two.

4. A waveform processing device according to claim 1, wherein the filtering comprises:
   transforming each signal block in each set to a corresponding transform-domain signal using a first orthogonal transform;
   dividing each transform-domain signal to one or more subband-specific transform-domain signals to produce one or more subband-specific sets of transform-domain signals;
   applying a first transform-domain window function to each transform-domain signal in each subband-specific set, wherein the transform-domain window function is defined independently for each subband; and
   transforming each windowed transform-domain signal to a filtered signal block using a first inverse transform, wherein the first inverse transform is an inverse transform of the first orthogonal transform.

5. The waveform processing device according to claim 4, wherein the circuitry are further configured to perform:
   adjusting, after the filtering, timing of the filtered signal blocks separately for each subband based on former overlapping samples of a first filtered signal block corresponding to an OFDM symbol block and/or latter overlapping samples of a last filtered signal block corresponding to the OFDM symbol block; and/or
   modifying, in the filtering, weights of the first transform-domain window function for each subband based on estimated timing errors for each subband to adjust timing of the one or more filtered OFDM data blocks.

6. A waveform processing device according to claim 1, wherein the circuitry are further configured to perform:
   transforming each of said one or more filtered OFDM data blocks using a second orthogonal transform to produce OFDM subcarrier samples for channel equalization processing.

7. The waveform processing device according to claim 1, wherein the circuitry are further configured to perform:
   in response to the input signal comprising, in addition to the one or more subsequent OFDM symbol blocks corresponding to a first numerology and a first subcarrier spacing, one or more sets of one or more secondary OFDM symbol blocks, each set corresponding to a different second numerology with a different second subcarrier spacing larger than the first subcarrier spacing, performing the segmenting, the filtering and the combining normally for the one or more subsequent OFDM symbol blocks corresponding to the first numerology and performing the following for each set of one or more secondary OFDM symbol blocks:
   segmenting the one or more secondary OFDM symbol blocks to secondary signal blocks having a length equal to and being aligned with the one or more partially overlapping signals blocks of the first numerology, each secondary signal block comprising at least one OFDM data block of the one or more secondary OFDM symbol blocks;
   filtering each secondary signal block by applying at least a second transform-domain window function, wherein the second transform-domain window function is defined and applied subband-specifically and numerology-specifically; and
   resampling filtered secondary signal blocks to produce two or more filtered secondary OFDM data blocks for each subband and numerology.

8. A waveform processing device according to claim 3, wherein the circuitry are configured to perform the filtering and the combining as a part of a joint process with subsequent receiver OFDM processing, the joint process comprising performing, after the segmenting, the following:
   transforming each signal block in each pair of signal blocks created in the segmenting to a corresponding frequency-domain signal using a first orthogonal transform, wherein the first orthogonal transform is one of discrete Fourier transform and fast Fourier transform;

dividing each frequency-domain signal in each pair to one or more subband-specific frequency-domain signals to produce one or more subband-specific sets of pairs of frequency-domain signals, each pair corresponding to a subband of an OFDM symbol block;

applying a first frequency-domain window function to each frequency-domain signal in each subband-specific set, wherein the frequency-domain window function is defined independently for each subband-specific set; and performing the following separately for each subband-specific pair of windowed frequency-domain signals corresponding to first and second halves of an OFDM symbol block to produce OFDM subcarrier samples for channel equalization processing:

dividing each windowed frequency-domain signal in the pair to an even frequency-domain signal and an odd frequency-domain signal, wherein the even frequency-domain signal comprises even samples of a corresponding windowed frequency-domain signal and the odd frequency-domain signal comprises odd samples of the corresponding windowed frequency-domain signal, calculating a sum and a difference of even frequency-domain signals in the pair to form even sum and difference frequency-domain signals and a sum and a difference of odd frequency-domain signals in the pair to form odd sum and difference frequency-domain signals, transforming the odd sum frequency-domain signal to an odd sum signal block and the even difference frequency-domain signal to an even sum signal block using a first inverse transform, wherein the first inverse transform is an inverse transform of the first orthogonal transform, multiplying the odd sum signal block with a first twiddle factor and the even difference signal block with a second twiddle factor, transforming each multiplied signal block to a corresponding frequency-domain signal using a second orthogonal transform to form a modified odd sum frequency-domain signal and a modified even difference frequency-domain signal, wherein the second orthogonal transform is one of discrete Fourier transform and fast Fourier transform, and calculating a sum of the modified odd sum frequency-domain signal and the even sum frequency-domain signal to form even OFDM subcarrier samples and a sum of the modified even difference frequency-domain signal and the odd difference frequency-domain signal to form odd OFDM subcarrier samples.

9. A waveform processing device according to claim 8, wherein the circuitry are configured to implement the transforming of the odd sum frequency-domain signal and the multiplying of the odd sum signal block with the first twiddle factor as a first radix-2 decomposition comprising:

dividing the odd sum frequency-domain signal to an even-odd sum frequency-domain signal and an odd-odd sum frequency-domain signal, wherein the even-odd sum frequency-domain signal comprises even samples of the odd sum frequency-domain signal and the odd-odd sum frequency-domain signal comprises odd samples of the odd sum frequency-domain signal;

transforming the even-odd sum frequency-domain signal to an even-odd sum signal block and the odd-odd sum frequency-domain signal to an odd-odd sum signal block using a second inverse transform;

multiplying the even-odd sum signal block with a third twiddle factor and the odd-odd sum signal block with a fourth twiddle factor, calculating a sum and a difference of multiplied even-odd and odd-odd sum signal blocks; and concatenating a calculated sum signal block and a calculated difference signal block multiplied with the imaginary unit.

10. A waveform processing device according to claim 9, wherein the circuitry are configured to implement the multiplying the even difference signal block with a second twiddle factor and the transforming of the multiplied even difference signal as a second radix-2 decomposition comprising:

segmenting the even difference signal block to first and second halves of the even difference signal block;

calculating a sum and a difference of the first half of the even difference signal block and the second half of the even difference signal block multiplied with the imaginary unit;

multiplying the summed first and second halves with a fifth twiddle factor and the subtracted first and second halves with a sixth twiddle factor, transforming the signal blocks multiplied with the fifth and sixth twiddle factors using a third orthogonal transform, wherein the third orthogonal transform is one of discrete Fourier transform and fast Fourier transform; and combining frequency-domain signals associated with the fifth and sixth twiddle factors, wherein even samples of resulting combined frequency-domain signal are samples of the frequency-domain signal associated with the fifth twiddle factor and odd samples of the resulting combined frequency-domain signal are samples of the frequency-domain signal associated with sixth twiddle factor.

11. The waveform processing device according to claim 1, wherein the circuitry are configured to process one or more odd signal blocks of the pre-defined number of partially overlapping signal blocks separately and in parallel with one or more even signal blocks of the pre-defined number of partially overlapping signal blocks, and/or the one or more subsequent OFDM symbol blocks comprise at least two subsequent OFDM symbol blocks and the circuitry are configured to process one or more odd OFDM symbol blocks of the at least two subsequent OFDM symbol blocks separately and in parallel with one or more even OFDM symbol blocks of the at least two subsequent OFDM symbol blocks.

12. The waveform processing device according to claim 1, wherein any orthogonal transform is one of a discrete Fourier transform, a fast Fourier transform, a Hartley transform and a number theoretic transform.

13. The waveform processing device of claim 1, wherein the circuitry comprise:

at least one processor, and at least one memory including computer program code, the at least one memory and computer program code configured to, with the at least one processor, cause the performance of the waveform processing device.

14. A waveform processing device comprising circuitry for performing:

receiving one or more input signals each of which comprises one or more subsequent orthogonal frequency division multiplexing, OFDM, symbol blocks corresponding to different subbands, each OFDM symbol block comprising a cyclic prefix and an OFDM data block;
segmenting each OFDM symbol block of the one or more input signals into a set of a pre-defined number of partially overlapping signal blocks having equal length and being zero-padded from both sides to achieve the overlapping, wherein a first signal block in each set comprises the cyclic prefix and non-zero samples of the pre-defined number of zero-padded signal blocks in each set comprise, in combination, the OFDM symbol block;
filtering each signal block in each set; and
combining the filtered signal blocks using overlap-and-add processing to produce one or more filtered OFDM symbol blocks containing all subbands.

15. The waveform processing device according to claim 14, wherein the pre-defined number of partially overlapping signal blocks is equal to two.

16. A waveform processing device according to claim 14, wherein the filtering comprises:
transforming each signal block in each set to a corresponding transform-domain signal using a first orthogonal transform;
applying a transform-domain window function to each transform-domain signal in each subband-specific set, wherein the transform-domain window function is defined independently for each subband;
combining windowed transform-plane signals corresponding to different subbands but same signal blocks to produce a set of signal block-specific combined transform-plane signals; and
transforming each combined transform-domain signal to a filtered signal block using a first inverse transform, wherein the first inverse transform is an inverse transform of the first orthogonal transform.

17. The waveform processing device according to claim 16, wherein the circuitry are further configured to perform:
adjusting, in the combining of the filtered signal blocks, spacing between subsequent filtered OFDM data blocks to match to a first pre-defined cyclic prefix duration by extrapolating the cyclic prefix using overlapping samples of filtered signal blocks and/or by interpolating the cyclic prefix.

18. A waveform processing device according to claim 17, wherein the circuitry are further configured to perform:
extending, in the combining of the filtered signal blocks, the cyclic prefix of at least one filtered OFDM symbol block to match to a second pre-defined cyclic prefix duration longer than the first cyclic prefix duration using at least one overlapping sample of a corresponding filtered signal block and/or by interpolating the cyclic prefix of a corresponding input signal.

19. The waveform processing device according to claim 14, wherein overlapping in each set of the pre-defined number of partially overlapping signal blocks corresponds to an overlap factor of 0.5-NCP/N for the first signal block in the set and to an overlap factor of 0.5 for any other signal blocks in the set, NCP being a length of the cyclic prefix and N being a length of any signal block.

20. The waveform processing device according to claim 14, wherein the circuitry are configured to process one or more odd signal blocks of the pre-defined number of partially overlapping signal blocks separately and in parallel with one or more even signal blocks of the pre-defined number of partially overlapping signal blocks, and/or the one or more subsequent OFDM symbol blocks comprise at least two subsequent OFDM symbol blocks and the circuitry are configured to process one or more odd OFDM symbol blocks of the at least two subsequent OFDM symbol blocks separately and in parallel with one or more even OFDM symbol blocks of the at least two subsequent OFDM symbol blocks.

21. The waveform processing device according to claim 14, wherein any orthogonal transform is one of a discrete Fourier transform, a fast Fourier transform, a Hartley transform and a number theoretic transform.

22. The waveform processing device of claim 14, wherein the circuitry comprise:
at least one processor, and
at least one memory including computer program code, the at least one memory and computer program code configured to, with the at least one processor, cause the performance of the waveform processing device.

23. A method comprising:
receiving an input signal comprising one or more subsequent orthogonal frequency division multiplexing, OFDM, symbol blocks each of which comprises a cyclic prefix and an OFDM data block and corresponds to one or more subbands;
segmenting each OFDM symbol block of the input signal into a set of a pre-defined number of partially overlapping signal blocks of equal length, wherein non-overlapping samples of the pre-defined number of partially overlapping signal blocks in each set comprise, in combination, an OFDM data block;
filtering each signal block in each set; and
combining the filtered signal blocks in each set using overlap-and-save processing to produce one or more filtered OFDM data blocks for each subband.

24. A computer program product comprising a non-transitory computer-readable medium having instructions thereon for causing an apparatus to perform at least the following:
receiving an input signal comprising one or more subsequent orthogonal frequency division multiplexing, OFDM, symbol blocks each of which comprises a cyclic prefix and an OFDM data block and corresponds to one or more subbands;
segmenting each OFDM symbol block of the input signal into a set of a pre-defined number of partially overlapping signal blocks of equal length, wherein non-overlapping samples of the pre-defined number of partially overlapping signal blocks in each set comprise, in combination, an OFDM data block;
filtering each signal block in each set; and
combining the filtered signal blocks in each set using overlap-and-save processing to produce one or more filtered OFDM data blocks for each subband.

25. A method comprising
receiving one or more input signals each of which comprises one or more subsequent orthogonal frequency division multiplexing, OFDM, symbol blocks corresponding to different subbands, each OFDM symbol block comprising a cyclic prefix and an OFDM data block;
segmenting each OFDM symbol block of the one or more input signals into a set of a pre-defined number of partially overlapping signal blocks having equal length and being zero-padded from both sides to achieve the overlapping, wherein a first signal block in each set comprises the cyclic prefix and non-zero samples of the pre-defined number of zero-padded signal blocks in each set comprise, in combination, the OFDM symbol block;

filtering each signal block in each set; and combining the filtered signal blocks using overlap-and-add processing to produce one or more filtered OFDM symbol blocks containing all subbands.

26. A computer program product comprising a non-transitory computer-readable medium having instructions thereon for causing an apparatus to perform at least the following:

receiving one or more input signals each of which comprises one or more subsequent orthogonal frequency division multiplexing, OFDM, symbol blocks corresponding to different subbands, each OFDM symbol block comprising a cyclic prefix and an OFDM data block;

segmenting each OFDM symbol block of the one or more input signals into a set of a pre-defined number of partially overlapping signal blocks having equal length and being zero-padded from both sides to achieve the overlapping, wherein a first signal block in each set comprises the cyclic prefix and non-zero samples of the pre-defined number of zero-padded signal blocks in each set comprise, in combination, the OFDM symbol block;

filtering each signal block in each set; and combining the filtered signal blocks using overlap-and-add processing to produce one or more filtered OFDM symbol blocks containing all subbands.

* * * * *

UNITED STATES PATENT AND TRADEMARK OFFICE
CERTIFICATE OF CORRECTION

PATENT NO. : 10,778,476 B2  
APPLICATION NO. : 16/439054  
DATED : September 15, 2020  
INVENTOR(S) : Markku Renfors et al.

Page 1 of 1

It is certified that error appears in the above-identified patent and that said Letters Patent is hereby corrected as shown below:

In the Claims

In Claim 8, Column 26, Line 62, delete "ofa" and replace with --of a--.

Signed and Sealed this  
Twenty-seventh Day of October, 2020

Andrei Iancu  
*Director of the United States Patent and Trademark Office*